(12) United States Patent
Ohtorii

(10) Patent No.: US 7,651,279 B2
(45) Date of Patent: Jan. 26, 2010

(54) OPTICAL-ELECTRICAL TRANSMISSION CONNECTOR, OPTICAL-ELECTRICAL TRANSMISSION DEVICE AND ELECTRONIC DEVICE

(75) Inventor: Hiizu Ohtorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/346,503

(22) Filed: Dec. 30, 2008

(65) Prior Publication Data

US 2009/0196550 A1 Aug. 6, 2009

(30) Foreign Application Priority Data

Jan. 31, 2008 (JP) ............... 2008-020737

(51) Int. Cl.
*G02B 6/36* (2006.01)
(52) U.S. Cl. .......................... 385/89; 385/93
(58) Field of Classification Search ............. 385/88–93, 385/147
See application file for complete search history.

(56) References Cited

U.S. PATENT DOCUMENTS

| | | | |
|---|---|---|---|
| 4,678,264 A | 7/1987 | Bowen | |
| 6,071,015 A | 6/2000 | Erbse et al. | |
| 6,478,479 B1 * | 11/2002 | Kim et al. | 385/92 |
| 7,197,208 B2 * | 3/2007 | Trutna et al. | 385/37 |
| 7,231,111 B2 * | 6/2007 | Shibata | 385/27 |
| 7,419,310 B2 * | 9/2008 | Mizuno | 385/88 |
| 7,564,623 B2 * | 7/2009 | Vodyanoy et al. | 359/385 |
| 2003/0031427 A1 | 2/2003 | Brezina et al. | |
| 2003/0138223 A1 | 7/2003 | Sasaki et al. | |
| 2005/0160186 A1 | 7/2005 | Ruiz | |
| 2007/0019914 A1 | 1/2007 | Ohtsu et al. | |
| 2007/0237056 A1 * | 10/2007 | Hineno | 369/112.05 |
| 2009/0097383 A1 * | 4/2009 | Yokota | 369/112.23 |

FOREIGN PATENT DOCUMENTS

| | | |
|---|---|---|
| EP | 1 184 697 | 3/2002 |
| EP | 1 431 787 | 6/2004 |
| GB | 2 119 120 | 11/1983 |
| WO | WO 2007/144710 | 12/2007 |

OTHER PUBLICATIONS

"Encounter to Optical-Electrical Interconnection", Nikkei Electronics, Dec. 3, 2001, pp. 122-125.

* cited by examiner

*Primary Examiner*—Akm E Ullah
(74) *Attorney, Agent, or Firm*—Robert J. Depke; Rockey, Depke & Lyons, LLC

(57) ABSTRACT

An optical-electrical transmission connector having resistance to optical axis misalignment, having small loss, easily increasing the number of buses, and capable of being formed of a commonly-used material is provided. In a male connector, one collimating lens facing the other collimating lens when connecting the male connector to a female connector is arranged, and a light guide is arranged corresponding to the focal point of the one collimating lens. A positioning section is arranged corresponding to surroundings of the one collimating lens, and the positioning section has one inclined surface coming into contact with the other inclined surface when connecting the male connector to the female connector.

12 Claims, 9 Drawing Sheets

OPTICAL-ELECTRICAL TRANSMISSION CONNECTOR, OPTICAL-ELECTRICAL TRANSMISSION DEVICE AND ELECTRONIC DEVICE

CROSS REFERENCES TO RELATED APPLICATIONS

The present invention contains subject matter related to Japanese Patent Application JP 2008-020737 filed in the Japanese Patent Office on Jan. 31, 2008, the entire contents of which being incorporated herein by reference.

BACKGROUND OF THE INVENTION

1. Field of the Invention

The present invention relates to an optical-electrical transmission connector, an optical-electrical transmission device and an electronic device suitably applicable when communication between one device and the other device is performed by optical transmission.

2. Description of the Related Art

Signal transmission between semiconductor chips such as LSIs (Large-Scale Integrations) has been heretofore performed by electrical signals through a board interconnection. However, a necessary data exchange amount between semiconductor chips has pronouncedly increased with a recent increase in the functionality of MPUs (Micro Processing Units), thereby as a result various high-frequency issues occur.

Typical examples of the issues include RC (Register and Capacitor) signal delay, impedance mismatching, EMC (Electro Magnetic Compatibility)/EMI (Electro Magnetic Interference), crosstalk and the like. To overcome such issues, measures such as the optimization of interconnection arrangement, the development of new materials have been taken in related arts.

However, in recent years, effects by the optimization of interconnection arrangement, the development of new materials and the like have been hampered by physical limitations, and to achieve higher functionality of a system, it is necessary to reconsider a board configuration designed for simple mounting of semiconductor chips. For example, fine-pitch interconnection coupling by formation of a multichip module (MCM), electrical interconnection coupling by two-dimensional sealing and integration of various semiconductor chips and three-dimensional coupling of semiconductor chips which will be briefly described below have been developed.

Fine-Pitch Interconnection Coupling by Formation of a MCM

High-performance chips are mounted on a mounting board made of ceramic, silicon or the like, and the high-performance chips are coupled by fine-pitch interconnection. The coupling method allows a reduction in an interconnection pitch, thereby a data exchange amount is able to be remarkably increased by increasing a bus width.

Electrical Interconnection Coupling by Two-Dimensional Sealing and Integration of Various Semiconductor Chips Various semiconductor chips are two-dimensionally sealed and integrated by using a polyimide resin or the like, and the semiconductor chips are coupled on such an integrated board by fine-pitch interconnection. The coupling method allows a reduction in an interconnection pitch, thereby a data exchange amount is able to be remarkably increased by increasing a bus width.

Three-Dimensional Coupling of Semiconductor Chips

Through electrodes are arranged on various semiconductor chips, and the semiconductor chips are bonded together to form a laminate configuration. Connection between semiconductor chips of different kinds is physically shortened by the interconnection method, so that issues such as signal delay are able to be avoided. However, it is necessary to consider an increase in a heating value caused by laminating the semiconductor chips, a thermal stress between the semiconductor chips, and the like.

Moreover, to achieve higher-speed and larger-capacity signal exchange, optical transmission and coupling techniques by optical interconnection has been developed (for example, refer to Nikkei Electronics, "Encounter with optical interconnections", Dec. 3, 2001, p. 122-125, and NTT R&D, vol. 48, no. 3, p. 271-280 (1999)). When signal transmission between semiconductor chips is performed by optical signals, the issue of RC delay which arises in electrical interconnection is prevented, and the transmission speed is able to be remarkably improved. Further, when signal transmission between the semiconductor chips is performed by optical signals, it is not necessary to take measures against electromagnetic waves, thereby interconnection is able to be designed relatively freely.

Techniques of optical interconnection between semiconductor chips include various systems. Examples of the systems include an active interposer system, a free-space transmission system, an optical connector connection system, a light guide embedding system, a surface mounting system and the like which will be briefly described below.

Active Interposer System (refer to Nikkei Electronics, "Encounter with Optical Interconnections", Dec. 3, 2001, p. 125)

This is a system of propagating signals to a light guide mounted on a board interconnection. A photonic device such as a light-emitting device or a light-sensing device is mounted on a back surface of a transceiver module arranged on the board interconnection with a predetermined gap in between, and the photonic device is precisely positioned with respect to a 45° total reflection mirror of the light guide. The system has an advantage that the system is laid out on the mounting configuration of an existing board interconnection.

Free-Space Transmission System (refer to Nikkei Electronics, "Encounter with Optical Interconnections", Dec. 3, 2001, p. 123)

This is a system of propagating signals by mounting an optical interconnection board (quartz) on a back surface of a board interconnection, and reflecting light zigzag in the optical interconnection board. When photonic devices are arranged into an array, and signals are transmitted in a free space in the optical interconnection board, the number of channels is able to be increased to a few thousand channels in principle. Moreover, to make optical axis alignment easier, a hybrid optical system including a combination of a few lenses is formed. The system has advantages that multiplexing transmission of a few thousand channels is able to be performed in principle, and optical axis alignment is easily performed because of the hybrid optical system.

Optical Connector Connection System (refer to Nikkei Electronics, "Encounter with Optical Interconnections", Dec. 3, 2001, p. 122)

This is a system capable of freely setting a light guide after arranging an optical connector around a semiconductor chip, and mounting the semiconductor chip. The system has advantages that an optical axis alignment step of which the cost is high is not necessary because precision is secured by the optical connector, an optical fiber is used as a light guide, thereby intermediate-range transmission between interconnection boards or the like is able to be performed, and the system is able to be used on the mounting configuration of an existing interconnection board.

Light Guide Embedding System (refer to Nikkei Electronics, "Encounter with Optical Interconnections", Dec. 3, 2001, p. 124)

This is a system of directly bonding a photonic device to a back surface of a semiconductor chip, and embedding a light guide in an interconnection board. While the form of the mounting configuration of an existing interconnection board is maintained, an optical interconnection is able to be arranged. In this system, a microlens is used for optical path coupling, and the allowable amount of optical axis misalignment is able to be increased to a general mounting precision level. The system has advantages that an electrical interconnection path between the semiconductor chip and the photonic device is able to be minimized, and optical axis alignment is performed with general mounting precision by coupling of collimated light.

Surface Mounting System (refer to NTT R&D, vol. 48, no. 3, p. 271-280 (1999))

This is a system of directly bonding a photonic device on a back surface of a semiconductor chip, and directly mounting a light guide on an interconnection board. While the configuration of an existing interconnection board is maintained as it is, an optical interconnection is able to be also arranged. The system has advantages that an electrical interconnection path between the semiconductor chip and the photonic device is minimized because the photonic device is directly mounted on the back surface of the semiconductor chip, the configuration is simple, costs are able to be reduced, and the system is able to be laid out on the mounting configuration of an existing interconnection board.

SUMMARY OF THE INVENTION

However, in an active interposer system, the configuration is large, so there is an issue such that an interconnection board with low rigidity is deformed by an external stress, thereby optical axis misalignment easily occurs. In a free-space transmission system, there is an issue such that a signal propagates by reflection in an optical interconnection board, so a waveform is easily disturbed, and propagation loss is large. In an optical connector connection system, there is an issue such that an optical fiber is used as a transmission medium, so there is limitation on increasing the number of buses. In a light guide embedding system and a surface mounting system, a light guide is integrated with an interconnection board, so the light guide is exposed to a high-temperature process such as solder reflow or sealing with an underfill resin. Therefore, there is an issue such that as the light guide, it is necessary to select a special material having resistance to the high-temperature process.

Thus, in the systems in related arts, there are various issues such that the optical axis misalignment easily occurs, the loss is large, there is limitation on increasing the number of buses, and it is difficult to use a commonly-used material.

In view of the foregoing, it is desirable to provide an optical-electrical transmission connector, an optical-electrical transmission device and an electronic device having resistance to optical axis misalignment, having small loss, easily increasing the number of buses, and being able to be formed of a commonly-used material.

According to an embodiment of the invention, there is provided a first optical-electrical transmission connector being one optical-electrical transmission connector connected to the other optical-electrical transmission connector. The other optical-electrical transmission connector includes one or a plurality of optical devices including at least one of a light-emitting device emitting light to one direction and a light-sensing device sensing light from the one direction, and one or a plurality of first collimating lenses in a light-passing region where light emitted from or entering into the one or the plurality of optical devices passes through. The other optical-electrical transmission connector further includes a first positioning section having a ring-shaped first inclined surface arranged corresponding to surroundings of the first collimating lens when viewed from the one direction, and one or a plurality of first electrical transmission electrode pads formed corresponding to surroundings of the first inclined surface when viewed from the one direction. The one optical-electrical transmission connector (the first optical-electrical transmission connector) includes one or a plurality of second collimating lenses facing the first collimating lens in the one direction when connecting the one optical-electrical transmission connector to the other optical-electrical transmission connector, and one or a plurality of light guides arranged corresponding to the focal point of the second collimating lens. The first optical-electrical transmission connector further includes a second positioning section arranged corresponding to surroundings of the second collimating lens, and the second positioning section has a ring-shaped second inclined surface coming into contact with the first inclined surface when connecting the one optical-electrical transmission connector to the other optical-electrical transmission connector. Moreover, one or a plurality of second electrical transmission electrode pads coming into contact with the first electrical transmission electrode pad when connecting the one optical-electrical transmission connector to the other optical-electrical transmission connector are arranged corresponding to surroundings of the second inclined surface.

According to an embodiment of the invention, there is provided a second optical-electrical transmission connector being one optical-electrical transmission connector connected to the other optical-electrical transmission connector. The other optical-electrical transmission connector includes one or a plurality of first collimating lenses, and one or a plurality of light guides arranged corresponding to the focal point of the first collimating lens. The other optical-electrical transmission connector further includes a first positioning section having a ring-shaped first inclined surface arranged corresponding to the first collimating lens, and one or a plurality of first electrical transmission electrode pads formed corresponding to surroundings of the first inclined surface. The one optical-electrical transmission connector (the second optical-electrical transmission connector) includes one or a plurality of optical devices including at least one of a light-emitting device emitting light to the first collimating lens and a light-sensing device sensing light from the first collimating lens when connecting the second optical-electrical transmission connector to the other optical-electrical transmission connector, and one or a plurality of second collimating lenses arranged in a light-passing region where light emitted from or entering into the one or the plurality of optical device passes through. The second optical-electrical transmission connector further includes a second positioning section arranged corresponding to surroundings of the second collimating lens, and the second positioning section has a ring-shaped second inclined surface arranged so that when the second optical-electrical transmission connector is connected to the other optical-electrical transmission connector, the second positioning section comes into contact with the first inclined surface, and when the second position section comes into contact with the first inclined surface, the second collimating lens faces the first collimating lens. Moreover, one or a plurality of second electrical transmission electrode pads coming into contact with the first electrical transmission electrode pad when connecting the second optical-electrical transmission connector to the other optical-electrical transmission connector are arranged corresponding to surroundings of the second inclined surface.

In the first and second optical-electrical transmission connectors, when the first optical-electrical transmission connector is connected to the other optical-electrical transmission connector, the ring-shaped second inclined surface arranged corresponding to surroundings of the second collimating lens comes into contact with the ring-shaped first inclined surface arranged corresponding to surroundings of the first collimating lens, and the first positioning section and the second positioning section fit into each other. Thereby, even if there is a shape error in the first positioning section and the second positioning section, displacement between the central axis of a region surrounded by the second inclined surface and the central axis of a region surrounded by the first inclined surface is able to be reduced. As a result, optical axis misalignment between the optical axis of the second collimating lens arranged corresponding to surroundings of the second inclined surface and the optical axis of the first collimating lens arranged corresponding to surroundings of the first inclined surface is able to be reduced. Moreover, displacement between the second electrical transmission electrode pad arranged corresponding to surroundings of the second inclined surface and the first electrical transmission electrode pad arranged corresponding to surroundings of the first inclined surface is able to be reduced. Further, when the first optical-electrical transmission connector is connected to the other optical-electrical transmission connector, the first collimating lens and the second collimating lens face each other. Thereby, after light emitted from the optical device is converted into parallel light by the first collimating lens, the parallel light is condensed onto the light guide by the second collimating lens, or after light emitted from the light guide is converted into parallel light by the second collimating lens, the parallel light is condensed onto the optical device by the first collimating lens, so loss due to the optical axis misalignment or optical axis direction displacement is able to be reduced. Moreover, the first collimating lens and the second collimating lens each are arranged in a light-passing region, and are different from a component needing a large occupied volume such as an optical fiber; therefore, a large number of first collimating lenses and a large number of second collimating lenses are able to be used in small connectors. Further, the light guide is arranged in a connector in which an optical device is not mounted, so it is not necessary to select a special material having resistance to a high-temperature process for the light guide.

According to an embodiment of the invention, there is provided an optical-electrical transmission device including a first optical-electrical transmission connector and a second optical-electrical transmission connector connected to the first optical-electrical transmission connector. The first optical-electrical transmission connector includes one or a plurality of optical devices including at least one of a light-emitting device emitting light to one direction and a light-sensing device sensing light from the one direction, and one or a plurality of first collimating lenses arranged in a light-passing region where light emitted from or entering into the one or the plurality of optical devices passes through. The first optical-electrical transmission connector further includes a first positioning section having a ring-shaped first inclined surface formed corresponding to surroundings of the first collimating lens when viewed from the one direction, and one or a plurality of first electrical transmission electrode pads formed corresponding to surroundings of the first inclined surface when viewed from the one direction. On the other hand, the second optical-electrical transmission connector includes one or a plurality of second collimating lenses facing the first collimating lens in the one direction when connecting the second optical-electrical transmission connector to the first optical-electrical transmission connector, and one or a plurality of light guides arranged corresponding to the focal point of the second collimating lens. The second optical-electrical transmission connector further includes a second positioning section formed corresponding to surroundings of the second collimating lens, and coming into contact with the first inclined surface when connecting the second optical-electrical transmission connector to the first optical-electrical transmission connector. Moreover, one or a plurality of second electrical transmission electrode pads coming into contact with the first electrical transmission electrode pad when connecting the second optical-electrical transmission connector to the first optical-electrical transmission connector are arranged corresponding to surroundings of the second inclined surface.

In the optical-electrical transmission device according to the embodiment of the invention, when the first optical-electrical transmission connector and the second optical-electrical transmission connector are connected to each other, the ring-shaped first inclined surface arranged corresponding to the first collimating lens and the ring-shaped second inclined surface arranged corresponding to the second collimating lens come into contact with each other, and the first positioning section and the second positioning section fit into each other. Thereby, even if there is a shape error in the first positioning section and the second positioning section, displacement between the central axis of a region surrounded by the first inclined surface and the central axis of a region surrounded by the second inclined surface is able to be reduced. As a result, optical axis misalignment between the optical axis of the first collimating lens arranged corresponding to surroundings of the first inclined surface and the optical axis of the second collimating lens arranged corresponding to surroundings of the second inclined surface is able to be reduced. Moreover, displacement between the first electrical transmission electrode pad arranged corresponding to surroundings of the first inclined surface and the second electrical transmission electrode pad arranged corresponding to surroundings of the second inclined surface is able to be reduced. Further, when the first optical-electrical transmission connector and the second optical-electrical transmission connector are connected to each other, the first collimating lens and the second collimating lens face each other. Thereby, after light emitted from the optical device is converted into parallel light by the first collimating lens, the parallel light is condensed onto the light guide by the second collimating lens, or after light emitted from the light guide is converted into parallel light by the second collimating lens, the parallel light is condensed onto the optical device by the first collimating lens; therefore, loss due to optical axis misalignment or optical axis direction displacement is able to be reduced. Moreover, the first collimating lens and the second collimating lens each are arranged in a light-passing region, and are different from a component needing a large occupied volume such as an optical fiber; therefore, a large number of first collimating lenses and a large number of second collimating lenses are able to be used in small connectors. Further, the light guide is arranged in a connector (the second optical-electrical transmission connector) in which an optical device is not mounted, so it is not necessary to select a special material having resistance to a high-temperature process for the light guide.

According to an embodiment of the invention, there is provided an electronic device including an optical-electrical transmission device performing communication between one device and the other device by optical-electrical transmission. The optical-electrical transmission device includes a first optical-electrical transmission connector connected to the one device, a second optical-electrical transmission connector connected to the other device, and a third optical-electrical transmission connector connected to the first optical-electrical transmission connector and the second optical-electrical transmission connector. The first optical-electrical transmission connector includes one or a plurality of first optical devices including at least one of a first light-emitting device emitting light to a first direction and a first light-sensing device sensing light from the first direction, and one or a plurality of first collimating lenses arranged in a light-passing region where light emitted from or entering into the one or the plurality first optical devices passes through. The first optical-electrical transmission connector further includes a first positioning section having a ring-shaped first inclined surface formed corresponding to surroundings of the first collimating lens when viewed from the first direction, and one or a plurality of first electrical transmission electrode pads formed corresponding to surroundings of the first inclined surface when viewed from the first direction. The second optical-electrical transmission connector includes one or a plurality of second optical devices including at least one of a second light-emitting device emitting light to a second direction and a second light-sensing device sensing light from the second direction, and one or a plurality of second collimating lenses arranged in a light-passing region where light emitted from or entering into the one or the plurality of second optical devices passes through. The second optical-electrical transmission connector further includes a second positioning section having a ring-shaped second inclined surface formed corresponding to surroundings of the second collimating lens when viewed from the second direction, and one or a plurality of second electrical transmission electrode pads formed corresponding to surroundings of the second inclined surface when viewed from the second direction. The third optical-electrical transmission connector includes one or a plurality of third collimating lenses facing the first collimating lens in the first direction when connecting the third optical-electrical transmission connector to the first optical-electrical transmission connector, and one or a plurality of fourth collimating lenses facing the second collimating lens in the second direction when connecting the third optical-electrical transmission connector to the second optical-electrical transmission connector. Moreover, one or a plurality of light guides are arranged corresponding to each of the focal points of the third collimating lens and the fourth collimating lens. In the third optical-electrical transmission connector, a third positioning section are arranged corresponding to surroundings of the third collimating lens, and the third positioning section has a ring-shaped third inclined surface coming into contact with the first inclined surface when connecting the third optical-electrical transmission connector to the first optical-electrical transmission connector. Likewise, the fourth positioning section is arranged corresponding to surroundings of the fourth collimating lens, and the fourth positioning section has a ring-shaped fourth inclined surface coming into contact with the second inclined surface when connecting the third optical-electrical transmission connector to the second optical-electrical transmission connector. Moreover, one or a plurality of third electrical transmission electrode pads coming into contact with the first electrical transmission electrode pad when connecting the third optical-electrical transmission connector to the first optical-electrical transmission connector are arranged corresponding to surroundings of the third inclined surface, and one or a plurality of fourth electrical transmission electrode pads coming into contact with the second electrical transmission electrode pad when connecting the third optical-electrical transmission connector to the second optical-electrical transmission connector are arranged corresponding to surroundings of the fourth inclined surface.

In the electronic device according to the embodiment of the invention, when the first optical-electrical transmission connector and the third optical-electrical transmission connector are connected to each other, the ring-shaped first inclined surface arranged corresponding to surroundings of the first collimating lens and the ring-shaped third inclined surface arranged corresponding to surroundings of the third collimating lens come into contact with each other, and the first positioning section and the third positioning section fit into each other. Moreover, when the second optical-electrical transmission connector and the third optical-electrical transmission connector are connected to each other, the ring-shaped second inclined surface arranged corresponding to surroundings of the second collimating lens and the ring-shaped fourth inclined surface arranged corresponding to surroundings of the fourth collimating lens come into contact with each other, and the second positioning section and the fourth positioning section fit into each other. Thereby, even if there is a shape error in the first positioning section, the second positioning section, the third positioning section or the fourth positioning section, displacement between the central axis of a region surrounded by the first inclined surface and the central axis of a region surrounded by the third inclined surface or displacement between the central axis of a region surrounded by the second inclined surface and the central axis of a region surrounded by the fourth inclined surface is able to be reduced. As a result, optical axis misalignment between the optical axis of the first collimating lens arranged corresponding to surroundings of the first inclined surface and the optical axis of the third collimating lens arranged corresponding to surroundings of the third inclined surface or optical axis misalignment between the optical axis of the second collimating lens arranged corresponding to surroundings of the second inclined surface and the optical axis of the fourth collimating lens arranged corresponding to surroundings of the fourth inclined surface is able to be reduced. Moreover, displacement between the first electrical transmission electrode pad arranged corresponding to surroundings of the first inclined surface and the third electrical transmission electrode pad arranged corresponding to surroundings of the third inclined surface or displacement between the second electrical transmission electrode pad arranged corresponding to surroundings of the second inclined surface and the fourth electrical transmission electrode pad arranged corresponding to surroundings of the fourth inclined surface is able to be reduced. Further, when the first optical-electrical transmission connector and the third optical-electrical transmission connector are connected each other, the first collimating lens and the third collimating lens face each other, and when the second optical-electrical transmission connector and the third optical-electrical transmission connector are connected to each other, the second collimating lens and the fourth collimating lens face each other. Thereby, after light emitted from the first optical device is converted into parallel light by the first collimating lens, the parallel light is condensed onto the light guide by the third collimating lens, or after light emitted from the light guide is converted into parallel light by the third collimating lens, the parallel light is condensed onto the first optical device by the first collimating lens. Moreover, after light emitted from the second optical device is converted into parallel light by the second collimating lens, the parallel light is condensed onto the light guide by the fourth collimating lens, or after light emitted from the light guide is converted into parallel light by the fourth collimating lens, the parallel light is condensed onto the second optical device by the second collimating lens. As a result, loss due to optical axis misalignment or optical axis direction displacement is able to be reduced. Moreover, the first collimating lens, the second collimating lens, the third collimating lens and the fourth collimating lens each are arranged in a light-passing region, and are different from a component needing a large occupied volume such as an optical fiber; therefore, a large number of first collimating lenses, a large number of the second collimating lenses, a large number of the third collimating lenses and a large number of the fourth collimating lenses are able to be used in small connectors. Further, the light guide is arranged in a connector (the third optical-electrical transmission connector) in which an optical device is not mounted, so it is not necessary to select a special material having resistance to a high-temperature process for the light guide.

In the first and second optical-electrical transmission connectors and the optical-electrical transmission device according to the embodiment of the invention, when the optical-electrical transmission connectors are connected to each other, the first inclined surface and the second inclined surface come into contact with each other, so optical axis misalignment between the optical axis of the first collimating lens and the optical axis of the second collimating lens is able to be reduced. Moreover, the first collimating lens and the second collimating lens face each other, so loss due to optical axis misalignment or optical axis direction displacement is able to be reduced. Further, a large number of first collimating lenses and a large number of second collimating lenses are able to be used in small connectors, so the number of buses is able to be easily increased. Moreover, the light guide is arranged in a connector in which the optical device is not mounted, so a commonly-used material is used for the light guide. Thus, in the embodiment of the invention, optical axis misalignment does not easily occur, and loss is small, and the number of buses is able to be increased with little limitation, and a commonly-used material is able to be used.

In the electronic device according to the embodiment, when the optical-electrical transmission connectors are connected to each other, the first inclined surface and the third inclined surface come into contact with each other, and the second inclined surface and the fourth inclined surface come into contact with each other, so optical axis misalignment between the optical axis of the first collimating lens and the optical axis of the third collimating lens, or optical axis misalignment between the optical axis of the second collimating lens and the optical axis of the fourth collimating lens is able to be reduced. Moreover, the first collimating lens and the third collimating lens face each other, and the second collimating lens and the fourth collimating lens face each other, so loss due to optical axis misalignment or optical axis direction displacement is able to be reduced. Further, a large number of the first, second, third and fourth collimating lenses are able to be used in small connectors, so the number of buses is able to be easily increased. Moreover, the light guide is arranged in a connector in which the first optical device and the second optical device are not mounted, so a commonly-used material is able to be used for the light guide. Thus, in the embodiment of the invention, optical axis misalignment does not easily occur, and loss is small, and the number of buses is able to be increased with little limitation, and a commonly-used material is able to be used.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
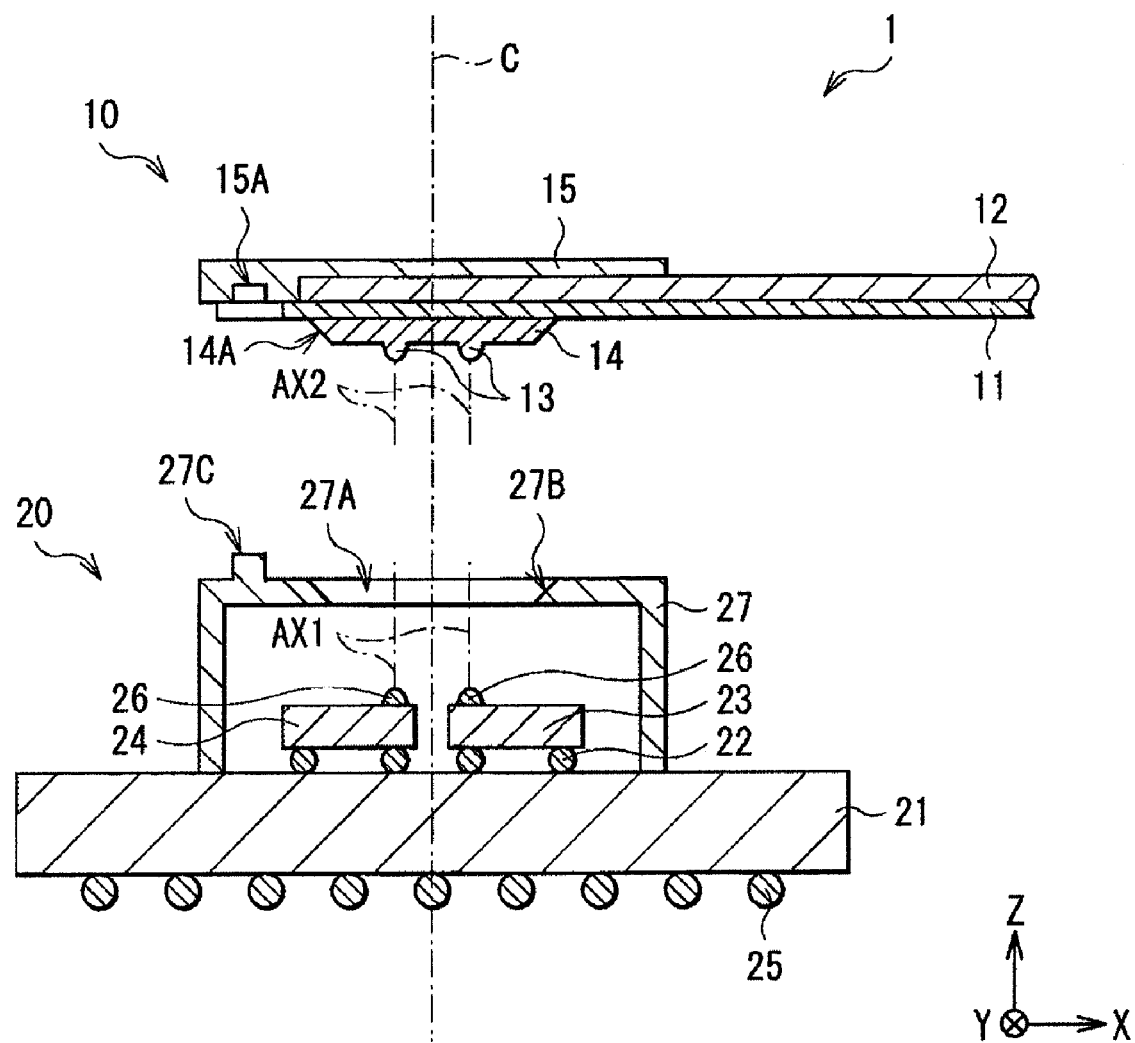
FIG. 1 is a sectional view of an optical-electrical transmission device according to a first embodiment of the invention.
Figure 2:
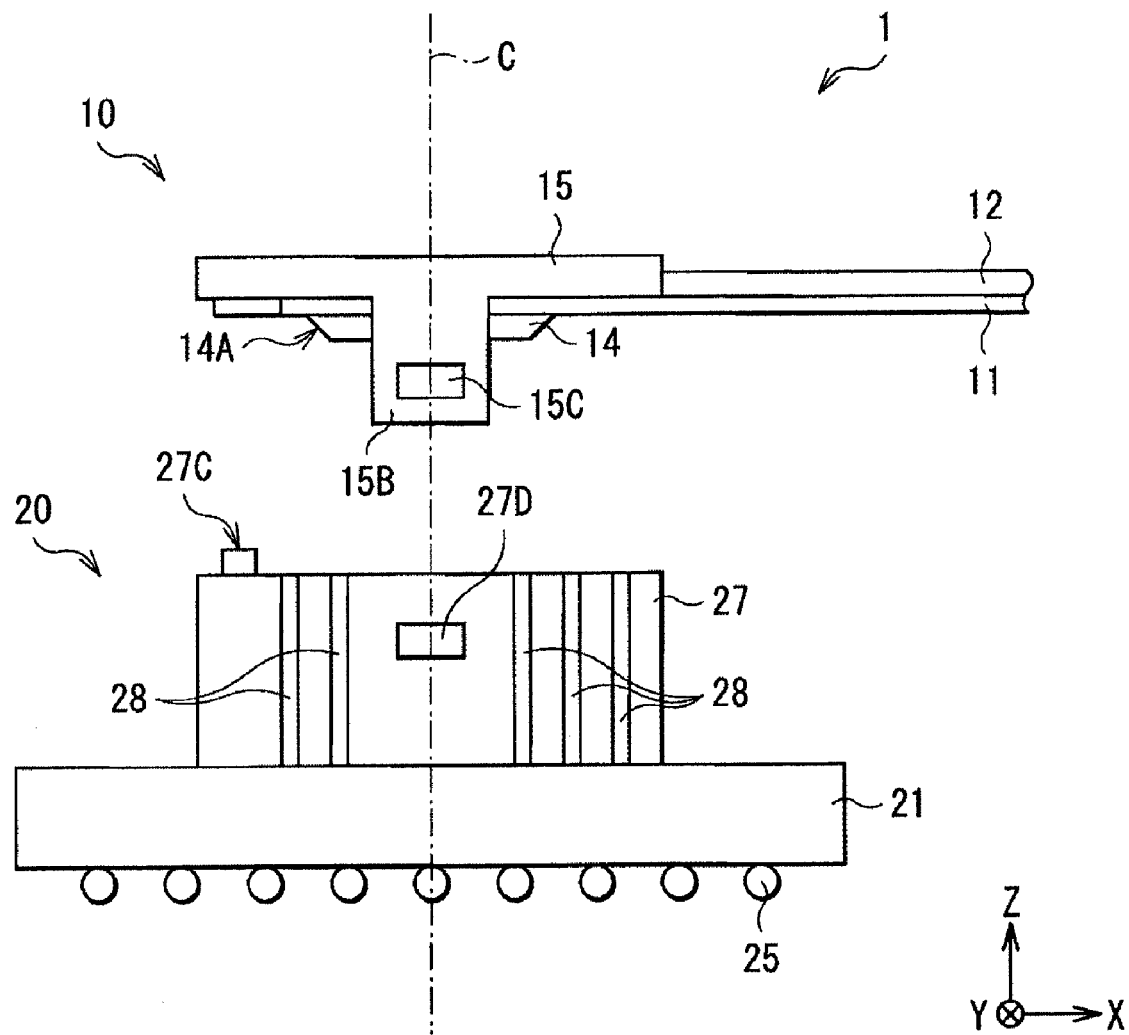
FIG. 2 is a side view of the optical-electrical transmission device shown in FIG. 1.
Figure 3:
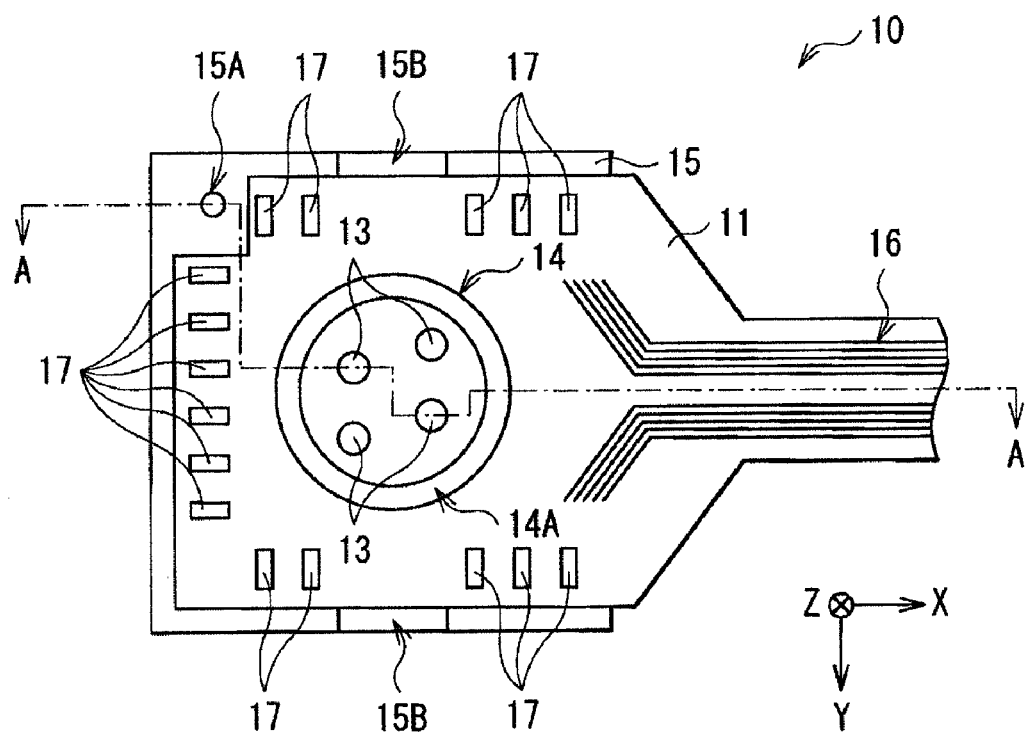
FIG. 3 is a plan view of a bottom surface of a male connector shown in FIG. 1.
Figure 4:
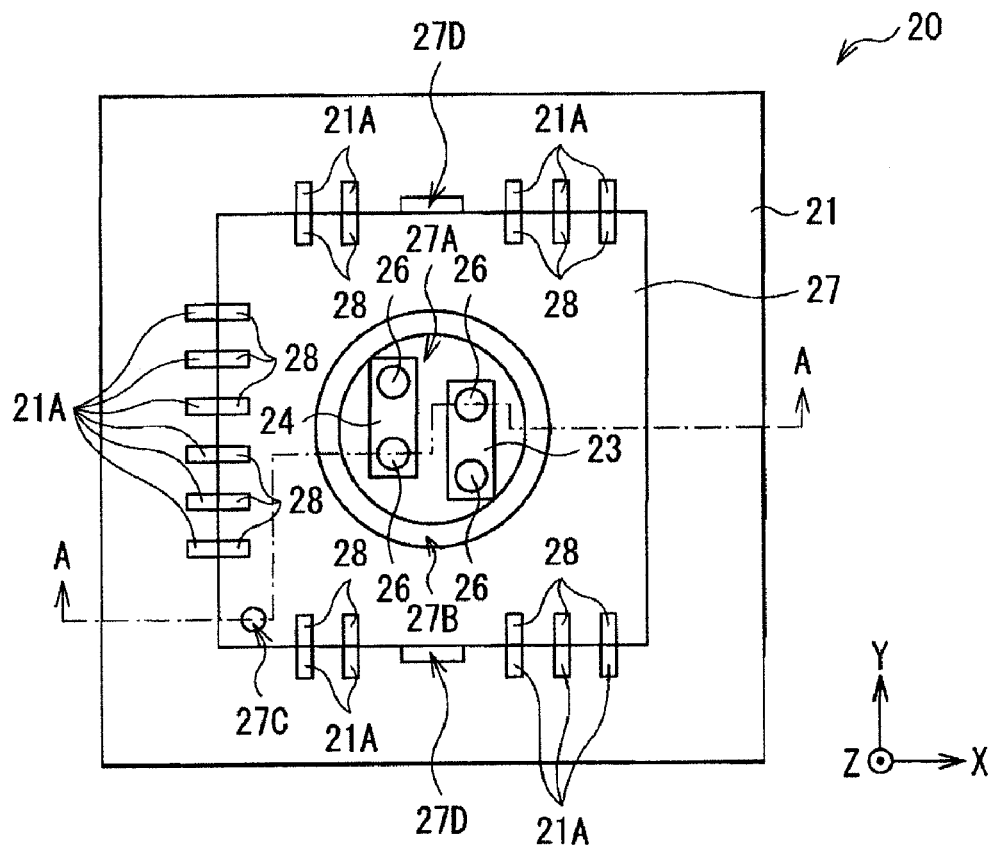
FIG. 4 is a plan view of a top surface of a female connector shown in FIG. 1.

FIG. 1 shows an example of a sectional configuration of an optical-electrical transmission device 1 according to a first embodiment of the invention. FIG. 2 shows an example of a side configuration of the optical-electrical transmission device 1 shown in FIG. 1. The optical-electrical transmission device 1 provides coupling between optical transmission paths as well as coupling between electrical transmission paths, and the optical-electrical transmission device 1 includes a male connector 10 and a female connector 20. FIG. 3 shows an example of a bottom surface configuration of the male connector 10, and FIG. 4 shows an example of a top surface configuration of the female connector 20. FIG. 1 corresponds to sectional configurations taken along arrow lines A-A of FIGS. 3 and 4.

In the male connector 10, one or a plurality of light guides 12, one or a plurality of collimating lenses 13, and positioning sections 14 and 15 are arranged on a flexible board 11.

The flexible board 11 is formed by forming one or a plurality of electrical interconnections 16 (refer to FIG. 3) made of copper foil on a film made of an electrical insulating material such as polyimide and having moderate flexibility.

The flexible board 11 is formed in a strip shape, and the electrical interconnections 16 are formed so as to extend in an extending direction of the flexible board 11. An electrode pad 17 is formed at an end of each electrical interconnection 16. The electrode pad 17 comes into contact with an electrical interconnection 28 (which will be described later) of the female connector 20 when connecting the male connector 10 to the female connector 20 so as to provide coupling between an electrical transmission path on the male connector 10 side and an electrical transmission path on the female connector 20 side. The electrode pad 17 has an exposed surface exposed to a surface on which the positioning section 14 is formed of the flexible board 11, and the exposed surface is formed around the positioning section 14 (specifically an inclined surface 14A which will be described later) when viewed from the normal direction to the flexible board 11. The pattern formation precision of the electrode pad 17 is, for example, approximately ±5 μm.

One or a plurality of light guides 12 propagate light entering from the collimating lens 13, or emit light propagating through the light guides 12 to the collimating lens 13, and constitute a part of the optical transmission path in the male connector 10. The light guide 12 is formed on one surface of the flexible board 11, and has a strip shape extending in an extending direction of the flexible board 11. In FIGS. 1 to 3, the case where the light guide 12 is formed on a surface opposite to a surface on which the positioning section 14 is formed of the flexible board 11 is exemplified. An end of the light guide 12 is arranged corresponding to the focal point of the collimating lens 13, and is optically coupled to the collimating lens 13. The light guide 12 is made of, for example, quartz, glass, a fluorine-based polymer, or an acrylic-based polymer.

One or a plurality of collimating lenses 13 convert light (divergent light) emitted from the light guide 12 into parallel light, or condense parallel light entering from the female connector 20 onto an end of the light guide 12. The collimating lens 13 is arranged on an optical transmission path in the male connector 10, and is arranged so as to face (be opposed to) a collimating lens 26 (which will be described later) of the female connector 20 in a direction of an optical axis (an optical axis AX2 in FIG. 1) of the collimating lens 13 when connecting the male connector 10 and the female connector 20 to each other. Moreover, the collimating lens 13 is arranged around a central axis C (which will be described later) of the positioning section 14 (that is, in a part off the central axis C). As exemplified in FIGS. 1 and 3, in the case where a plurality of collimating lenses 13 are arranged, the plurality of collimating lenses 13 are preferably arranged so as to be point-symmetrical about the central axis C. In addition, in this case, it is only necessary for adjacent collimating lenses 13 to be apart from each other to an extent to which they do not have an optical influence on each other (for example, a few μm), so a plurality of collimating lenses 13 are able to be integrated in a small region (for example, in a surface of the positioning section 14). Moreover, in the case where the collimating lens 13 is integrated with the positioning section 14, a position error between the collimating lens 13 and the positioning section 14 is able to be mostly eliminated.

The positioning section 14 determines the position of the male connector 10 with respect to the female connector 20 (a position in a direction orthogonal to an optical axis AX2) when connecting the male connector 10 to the female connector 20. The positioning section 14 is formed on one surface of the flexible board 11, for example, a surface on which the collimating lens 13 is formed of the flexible board 11. The positioning section 14 has, for example, a circular shape or an oval shape when viewed from the normal direction to the flexible board 11, and includes a ring-shaped inclined surface 14A having a normal intersecting the normal to the flexible board 11 in an edge of the positioning section 14. In addition, the inclined surface 14A preferably has a ring shape around the central axis C of the positioning section 14 (an axis passing through the center of the positioning section 14 and being parallel to the normal to the flexible board 11 when the positioning section 14 is viewed from the normal direction to the flexible board 11). The inclined surface 14A has a tapered shape in the positioning section 14, and the inclined surface 14A is formed so that a region (the positioning section 14) surrounded by the inclined surface 14A is narrower on a front side and wider on a back side when viewed from the female connector 20. The inclined surface 14A is formed corresponding to surroundings of the collimating lens 13, and when the male connector 10 is connected to the female connector 20, the inclined surface 14A comes into contact with an inclined surface 27B (which will be described later) of the female connector 20. As shown in FIGS. 1 and 2, in the case where the positioning section 14 is arranged between the collimating lens 13 and the flexible board 11, the positioning section 14 is preferably integrated with the collimating lens 13. The positioning section 14 is made of, for example, polyimide, and is able to be formed by, for example, injection molding. In the case where the positioning section 14 is formed by injection molding, insert molding or the like, the shape error of the positioning section 14 is, for example, approximately ±5 μm. Moreover, the mounting precision of the positioning section 14 is, for example, approximately ±10 μm.

The positioning section 15 determines the position of the male connector 10 with respect to the female connector 20 (a position in a direction of an optical axis AX2) when connecting the male connector 10 to the female connector 20. The positioning section 15 is formed on one surface of the flexible board 11, for example, a surface opposite to a surface on which the collimating lens 13 is formed of the flexible board 11. As shown in FIGS. 1 and 3, the positioning section 15 has a surface exposed to the female connector 20 in an edge of the positioning section 15, and the exposed surface has a depression 15A. The depression 15A is a columnar depression extending to the normal direction to the flexible board 11, and when a projection 27C (which will be described later) of the female connector 20 fits into the depression 15A, the male connector 10 is prevented from rotating about the central axis C while the male connector 10 is in contact with the female connector 20. Moreover, as shown in FIGS. 2 and 3, the positioning section 15 has a nail 15B projected in the normal direction to the flexible board 11 in a part of an edge of the positioning section 15. The nail 15B has an opening 15C, and when a projection 27D (which will be described later) of the female connector 20 fits into the opening 15C, the male connector 10 is prevented from being detached from the female connector 20. The positioning section 15 is made of, for example, polyimide, and is able to be formed by, for example, injection molding. In the case where the positioning section 15 is formed by injection molding, insert molding or the like, the shape error of the positioning section 15 is, for example, approximately ±5 μm. Moreover, the mounting precision of the positioning section 15 is, for example, approximately ±5 μm.

In the female connector 20, one or a plurality of light-emitting devices 23, one or a plurality of light-sensing devices 24, a collimating lens 26 and a positioning section 27 are arranged on an intermediate board 21.

The intermediate board 21 is formed by forming an electrical interconnection (not shown) made of copper foil or the like on an insulating substrate with high rigidity made of an insulating resin, a ceramic material or the like. An electrode pad (not shown) connected to the electrical interconnection is formed on one surface of the intermediate board 21 so as to be exposed, and the light-emitting device 23 and the light-sensing device 24 are arranged on the electrode pad with solder in between. Moreover, an electrode pad (not shown) connected to the electrical interconnection is formed on the other surface of the intermediate board 21 so as to be exposed, and solder 25 is arranged on the electrode pad. The solder 25 connects the electrode pad on the intermediate board 21 and an electrode pad on a printed circuit board or an LSI chip to each other when mounting the intermediate board 21 on the printed circuit board or the like. The pattern formation precision of the electrode pad on the intermediate board 21 is, for example, approximately ±5 μm.

As described above, one or a plurality of light-emitting devices 23 are arranged on one surface of the intermediate board 21, and are made of, for example, laser diodes (LDs), light emitting diodes (LEDs) or the like. The light emission region (light emission spot) of the light-emitting device 23 is arranged on a side opposite to the intermediate board 21, and the light-emitting device 23 is arranged so that when the male connector 10 is connected to the female connector 20, the light emission spot faces (is opposed to) the collimating lens 13 of the male connector 10, and light of the light-emitting device 23 is emitted to the collimating lens 13. Moreover, when the male connector 10 is connected to the female connector 20, the light-emitting device 23 (specifically a light emission region of the light-emitting device 23) is arranged around the central axis C (that is, in a part off the central axis C). The mounting precision of the light-emitting device 23 is, for example, ±5 μm.

One or a plurality of light-sensing devices 24 are arranged on the surface on which the light-emitting devices 23 are formed of the intermediate board 21, and are made of, for example, photodiodes (PDs) or the like. A light-sensing region of the light-sensing device 24 is arranged on a side opposite to the intermediate board 21, and when the male connector 10 is connected to the female connector 20, the light-sensing device 24 is arranged so that the light-sensing region face (is opposed to) the collimating lens 13, thereby the light-sensing device 24 detects light emitted from the collimating lenses 13. Moreover, when the male connector 10 is connected to the female connector 20, the light-sensing device 24 (specifically the light-sensing region of the light-sensing device 24) is arranged around the central axis C (that is, in a part off the central axis C). The mounting precision of the light-sensing device 24 is, for example, approximately ±5 μm.

One or a plurality of collimating lenses 26 convert light (divergent light) emitted from the light-emitting device 23 into parallel light, or condense light (parallel light) emitted from the collimating lens 13 of the male connector 10 to guide the light to the light-sensing region of the light-sensing device 24. The collimating lens 26 is arranged on an optical transmission path in the female connector 20 (an optical path for light emitted from the light-emitting device 23 and an optical path for light entering into the light-sensing device 24), and when the male connector 10 and the female connector 20 are connected to each other, the collimating lens 26 is arranged so as to face (be opposed to) the collimating lens 13 of the male connector 10 in a direction of an optical axis (an optical axis AX1 in FIG. 1) direction of the collimating lens 26. In other words, the collimating lens 26 is arranged around the central axis of the positioning section 27, and the optical axis AX1 and the optical axis AX2 (almost) overlap each other. As exemplified in FIGS. 1 and 4, in the case where a plurality of collimating lenses 26 are arranged, the plurality of collimating lenses 26 are preferably arranged so as to be point-symmetrical about the central axis of the positioning section 27. In this case, it is only necessary for adjacent collimating lenses 26 to be apart from each other to an extent to which they do not have an optical influence on each other (for example, a few μm), so a plurality of collimating lenses 26 are able to be integrated in a small region (for example, in the positioning section 27). Moreover, as shown in FIG. 1, one or a plurality of collimating lenses 26 may be formed in contact with the light-emitting device 23 or the light-sensing device 24 (may be integrated with the light-emitting device 23 or the light-sensing device 24), or one or a plurality of collimating lenses 26 may be formed separately from the light-emitting device 23 or the light-sensing device 24 with a predetermined gap in between. In the case where the collimating lenses 26 are integrated with the light-emitting device 23 or the light-sensing device 24, a position error between the collimating lens 26 and the light-emitting device 23 or the light-sensing device 24 is able to be mostly eliminated.

The positioning section 27 determines the position (a position in a direction orthogonal to the optical axis AX1) of the male connector 10 with respect to the female connector 20 when connecting the male connector 10 to the female connector 20. The positioning section 27 is formed on one surface of the intermediate board 21, for example, a surface on which the collimating lens 26 is formed of the intermediate board 21. The positioning section 27 has a tubular shape having a central axis in the normal direction to the intermediate board 21, and has an opening 27A on a top surface of the tubular shape. The opening 27A has the same shape as the positioning section 14 when viewed from the normal direction to the intermediate board 21, and the opening 27A has, for example, a circular shape or an oval shape. As in the case of the positioning section 14, the opening 27A preferably has a circular shape with the central axis of the positioning section 27 as its center. The opening 27A has a ring-shaped inclined surface 27B having a normal intersecting the normal to the top surface of the positioning section 27 on the tope surface of the positioning section 27. The inclined surface 27B has a tapered shape on the top surface of the positioning section 27, and the inclined surface 27B is formed so that a region (the opening 27A) surrounded by the inclined surface 27B is wider on a front side and narrower on a back side when viewed from the male connector 10. The inclined surface 27B is formed corresponding to surroundings of the collimating lens 26, and when the male connector 10 is connected to the female connector 20, the inclined surface 27B comes into contact with the inclined surface 14A of the male connector 10. Moreover, as shown in FIGS. 1 and 4, the positioning section 27 has a projection 27C on the top surface thereof. The projection 27C is a columnar projection extending in the normal direction to the intermediate board 21, and when the projection 27C fits into the depression 15A of the male connector 10, the male connector 10 is prevented from rotating about the central axis C while the male connector 10 is in contact with female connector 20. Further, as shown in FIGS. 2 and 4, the positioning section 27 has a projection 27D projected in a direction intersecting (orthogonal to) the normal direction to the intermediate board 21 in a part of a side of the tubular shape. When the projection 27D fits into the opening 15C of the male connector 10, the male connector 10 is prevented from being detached from the female connector 20. The positioning section 27 is made of, for example, polyimide, and is able to be formed by, for example, injection molding, insert molding or the like. In addition, in the case where the positioning section 27 is formed by injection molding, insert molding or the like, the shape error of the positioning section 27 is, for example, approximately ±20 µm in consideration of deformation in a reflow step. Further, the mounting precision of the positioning section 27 is, for example, approximately ±5 µm.

Figure 5A:
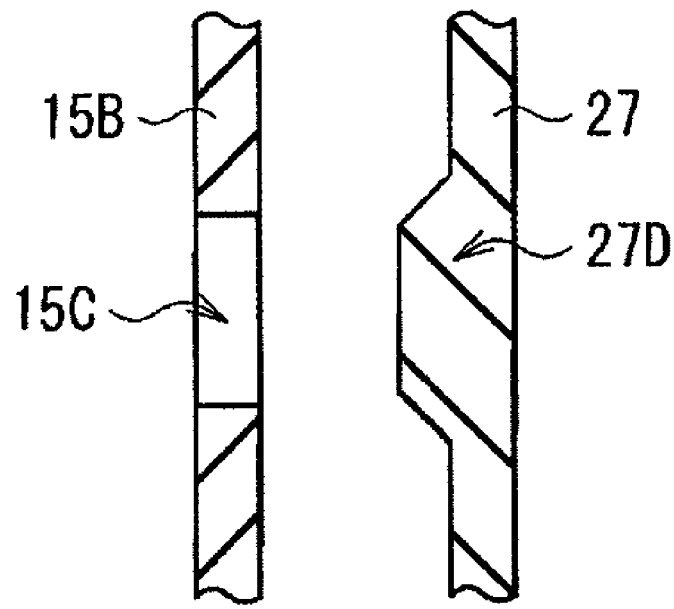
FIGS. 5A and 5B are sectional views of a modification of a positioning section shown in FIG. 1.
Figure 5B:
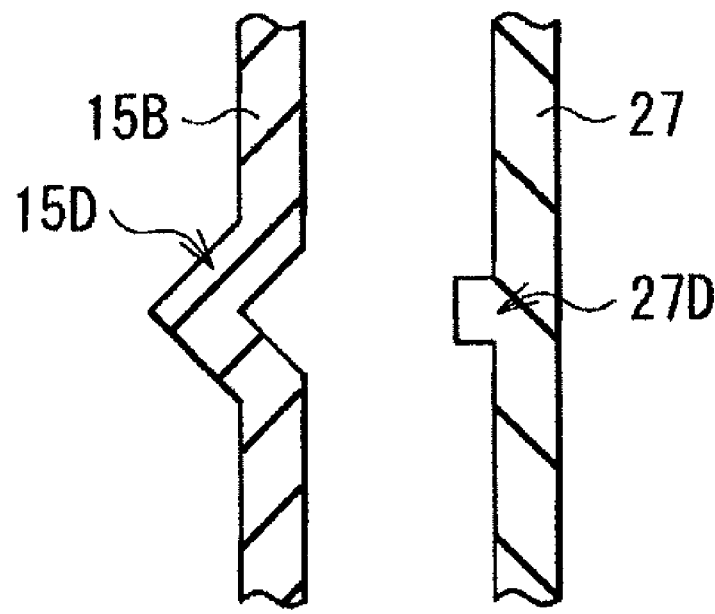

A mechanism of preventing the male connector 10 from being detached from the female connector 20 may be in any form other than the above-described mechanism. For example, as shown in FIG. 5A, the projection 27D may have a trapezoidal projection shape having a top surface which is slightly smaller than a region facing the opening 15C and a bottom surface which is slightly larger than the region facing the opening 15C, and when the male connector 10 is connected to the female connector 20, an inclined surface of the projection 27D may be pressed against an edge of the opening 15C. Moreover, for example, as shown in FIG. 5B, instead of the opening 15C, a depression 15D depressed in a direction opposite to the positioning section 27 may be arranged, and the projection 27D may fit into a depressed part of the depression 15D.

Moreover, as shown in FIGS. 2 and 4, on an outer edge (surroundings of the inclined surface 27B) of the positioning section 27, one or a plurality of electrical interconnections 28 extending from an outer edge of the bottom surface of the positioning section 27 to an outer edge of the top surface via a side surface are formed. When the male connector 10 is connected to the female connector 20, an end positioned on the top surface of the positioning section 27 of each electrical interconnection 28 comes into contact with the electrode pad 17 of the male connector 10 so as to have a role as the electrode pad 17 providing coupling between an electrical transmission path on the male connector 10 side and an electrical transmission path on the female connector 20 side. Further, an end positioned on the bottom surface of the positioning section 27 of each electrical interconnection 28 has a role as an electrode pad connected to the electrode pad 21A (refer to FIG. 4) formed on a surface of the intermediate board 21.

In the optical-electrical transmission device 1 according to the embodiment, after the male connector 10 and the female connector 20 are connected to each other, when the light-emitting device 23 is driven, light is emitted from the light-emitting device 23, and the light is converted into parallel light by the collimating lens 26. After that, after the parallel light propagates through a space (gap) between the male connector 10 and the female connector 20, and passes through the opening 27A, the parallel light enters into the collimating lens 13. The light entering into the collimating lens 13 is condensed onto an end of the light guide 12 by the collimating lens 13, and propagates through the light guide 12, and finally, the light is inputted into one device connected to the light guide 12. Moreover, after the male connector 10 and the female connector 20 are connected to each other, when light propagates from one device connected to the male connector 10, the light is converted into parallel light by the collimating lens 13. After that, after the parallel light propagates through a space (gap) between the male connector 10 and the female connector 20, and passes through the opening 27A, the parallel light enters into the collimating lens 26. After the light entering into the collimating lens 26 is condensed onto a light-sensing region of the light-sensing device 24 by the collimating lens 26, and is converted into a photocurrent in the light-sensing device 24, the photocurrent outputted from the light-sensing device 24 is finally inputted into another device connected through the intermediate board 21 or a printed board. Thus, in the optical-electrical transmission device 1, communication between one device and the other device is performed by optical transmission. Moreover, an electrical signal from one device connected to the male connector 10 side propagates to the other device connected to the female connector 20 side through the electrical interconnection 16, the electrode pad 17 and the electrical interconnection 28, or an electrical signal from the other device connected to the female connector 20 side propagates to the one device connected to the male connector side through the electrical interconnection 28, the electrode pad 17 and the electrical interconnection 16. Thus, in the optical-electrical transmission device 1, communication between one device and the other device is performed by electrical transmission.

In the embodiment, when the male connector 10 and the female connector 20 are connected to each other, the ring-shaped inclined surface 14A arranged corresponding to surroundings of the collimating lens 13 and the ring-shaped inclined surface 26B arranged corresponding to surroundings of the collimating lens 26 come into contact with each other, and the positioning sections 14 and 27 fit into each other. Thereby, even if each component constituting the male connector 10 and the female connector 20 has a shape error or a mounting error, displacement between the central axis of a region surrounded by the inclined surface 14A and central axis of a region surrounded by the inclined surface 26B is able to be reduced.

For example, in the case where the shape error or the mounting error of each component constituting the male connector 10 and the female connector 20 is estimated as follows, the optical axis misalignment between the optical axis AX2 of the collimating lens 13 arranged corresponding to surroundings of the inclined surface 14A and the optical axis AX1 of the collimating lens 26 arranged corresponding to surroundings of the inclined surface 26B is approximately ±55 µm at maximum. In the embodiment, optical transmission between the male connector 10 and the female connector 20 is performed by parallel light by the collimating lenses 13 and 26, so even if the optical axis misalignment between the optical axis AX2 of the collimating lens 13 and the optical axis AX1 of the collimating lens 26 is approximately ±55 µm, light loss is able to be reduced to approximately 10% at most, so optical transmission is able to be performed with low loss. Likewise, displacement between the electrode pad 17 arranged corresponding to surrounding of the inclined surface 14A and the electrical interconnection 28 arranged corresponding to surrounding of the inclined surface 26B is able to be reduced, so in the optical-electrical transmission device 1, electrical transmission between the male connector 10 and the female connector 20 is able to be performed together with optical transmission.

Pattern formation precision of electrode pad 17: ±5 µm

Position error between collimating lens 13 and positioning section 14: zero

Shape error of positioning section 14: ±5 µm

Mounting error of positioning section 14: ±10 µm

Pattern formation precision of electrode pad on the intermediate board 21: ±5 µm Mounting precision of light-emitting device 23 and light-sensing device 24: ±5 µm Position error between collimating lens 26 and light-emitting device 23 or light-sensing device 24: zero Shape error of positioning section 27 (in consideration of deformation in reflow step): ±20 μm Mounting precision of positioning section 27: ±5 μm Total: ±55 μm Moreover, in the embodiment, the collimating lenses 13 and 26 each are arranged in a light-passing region, and are different from a component needing a large occupied volume such as an optical fiber. Therefore, a large number of collimating lenses 13 and 26 are able to be used on a surface of the small positioning section 14 or in the positioning section 27, thereby the number of buses is able to be easily increased with little limitation. Moreover, in the embodiment, the light guide 12 is arranged in a connector (the male connector 10) in which the light-emitting device 23 or the light-sensing device 24 is not mounted, so it is not necessary to select a special material having resistance to a high-temperature process for the light guide 12, and a commonly-used material is able to be used.

Further, in the embodiment, the male connector 10 and the female connector 20 are connected to each other in the normal direction to the intermediate board 21, so an IC socket structure widely penetrating in the mounting industry is able to be used in the positioning sections 14 and 27. There are a large number of data about IC sockets such as materials, insulation or reliability, and various companies handle IC sockets. Therefore, the IC sockets are acceptable in all aspects such as functions, cost and reliability, and are easily adopted into an existing board process. Therefore, when the optical-electrical transmission device 1 according to the embodiment is used in an electronic device, there is an advantage that enormous efforts to confirm performance, reliability or the like are not necessary.

Moreover, in the embodiment, in the case where the intermediate board 21 is directly mounted on an LSI chip, the length of an electrical line providing coupling between the light-emitting device 23 or the light-sensing device 24 and the LSI chip is able to be minimized. Thereby, it is easier to take measures against noises of electrical signals or crosstalk, and a light modulation rate is able to be improved.

Second Embodiment

Figure 6:
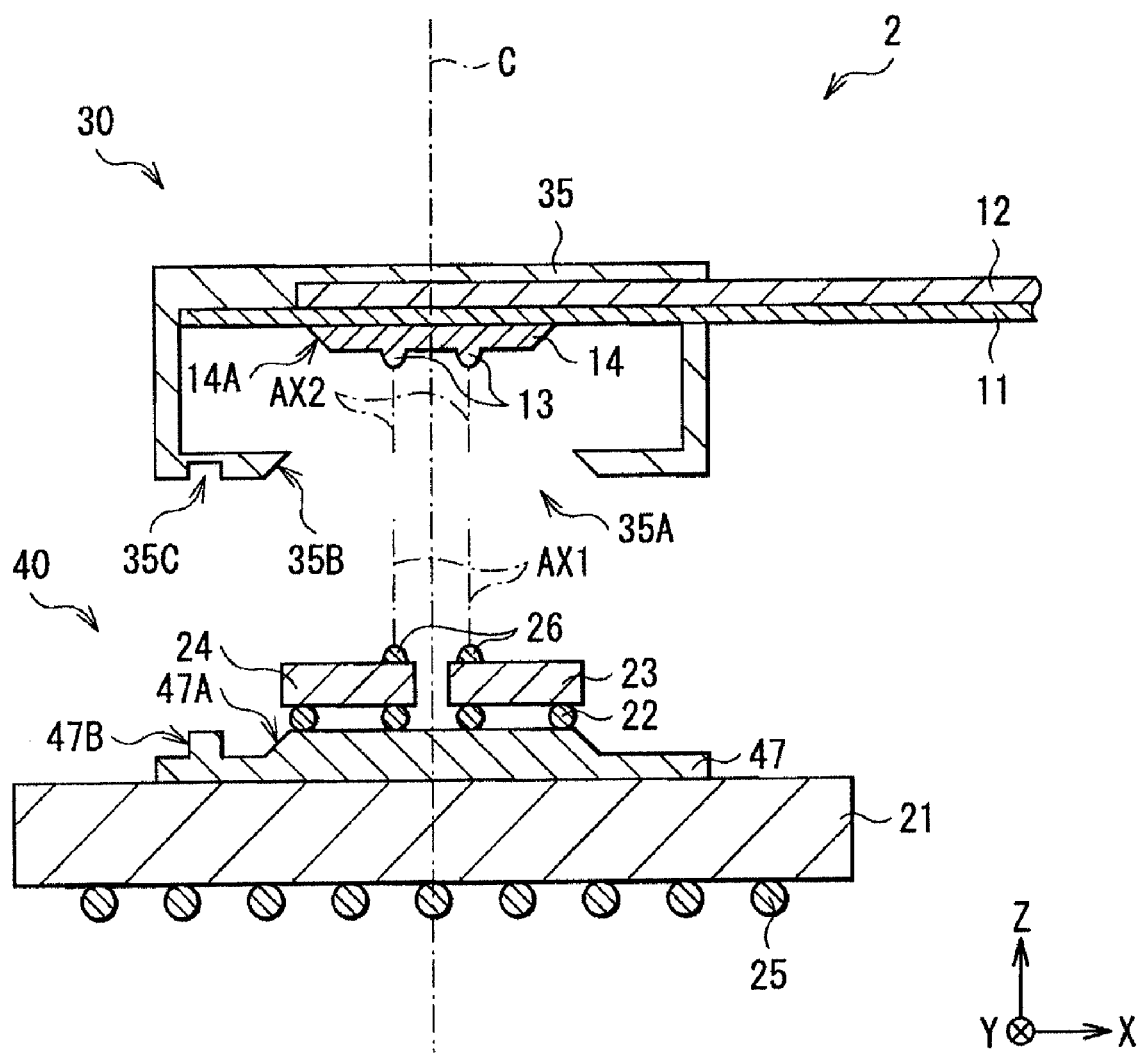
FIG. 6 is a sectional view of an optical-electrical transmission device according to a second embodiment of the invention.
Figure 7:
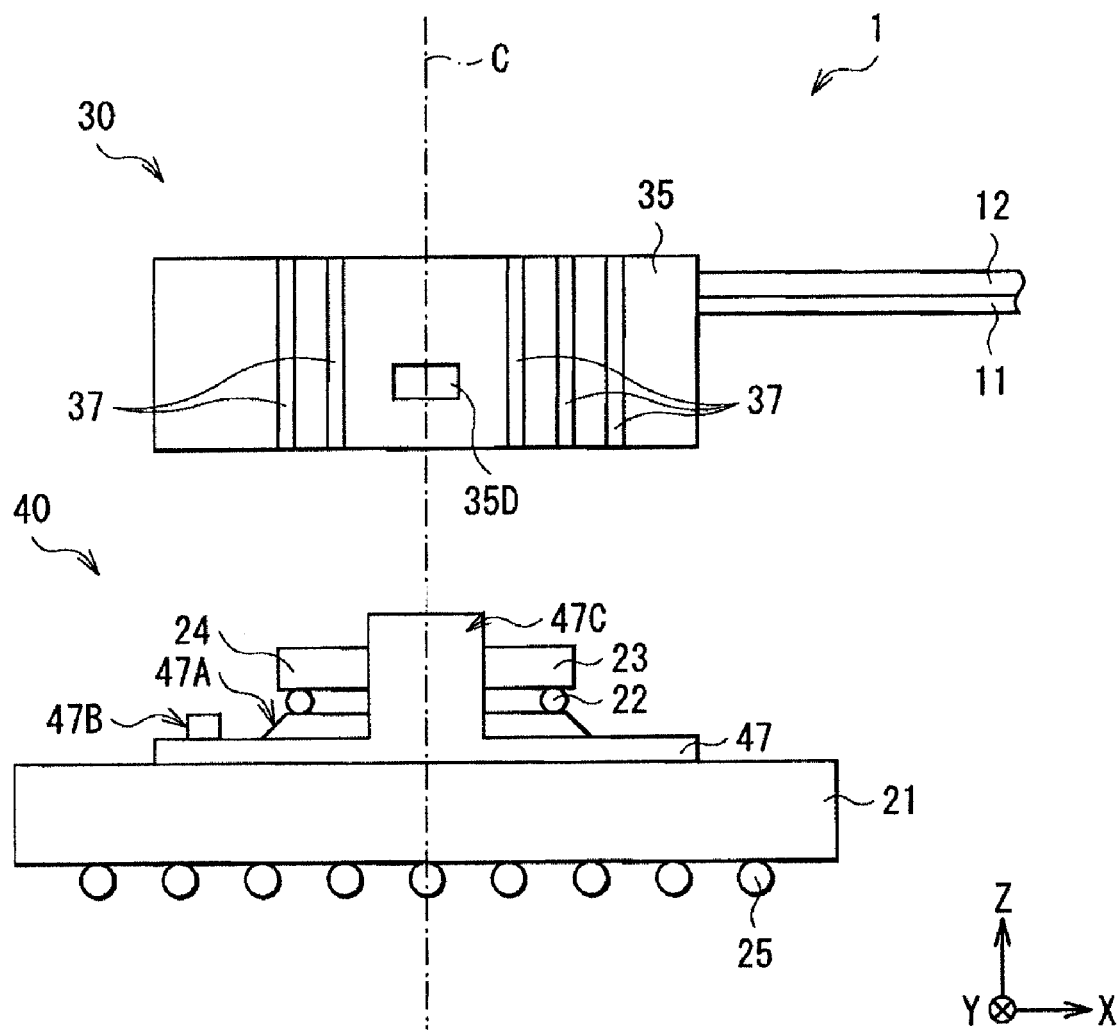
FIG. 7 is a side view of the optical-electrical transmission device shown in FIG. 6.
Figure 8:
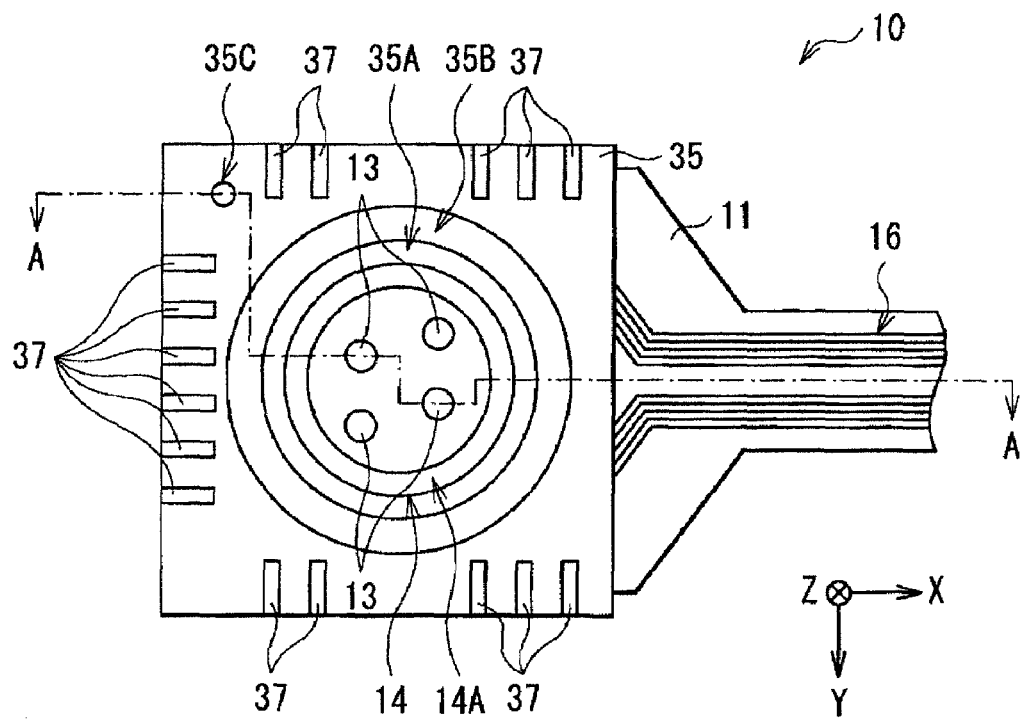
FIG. 8 is a plan view of a bottom surface of a female connector shown in FIG. 6.
Figure 9:
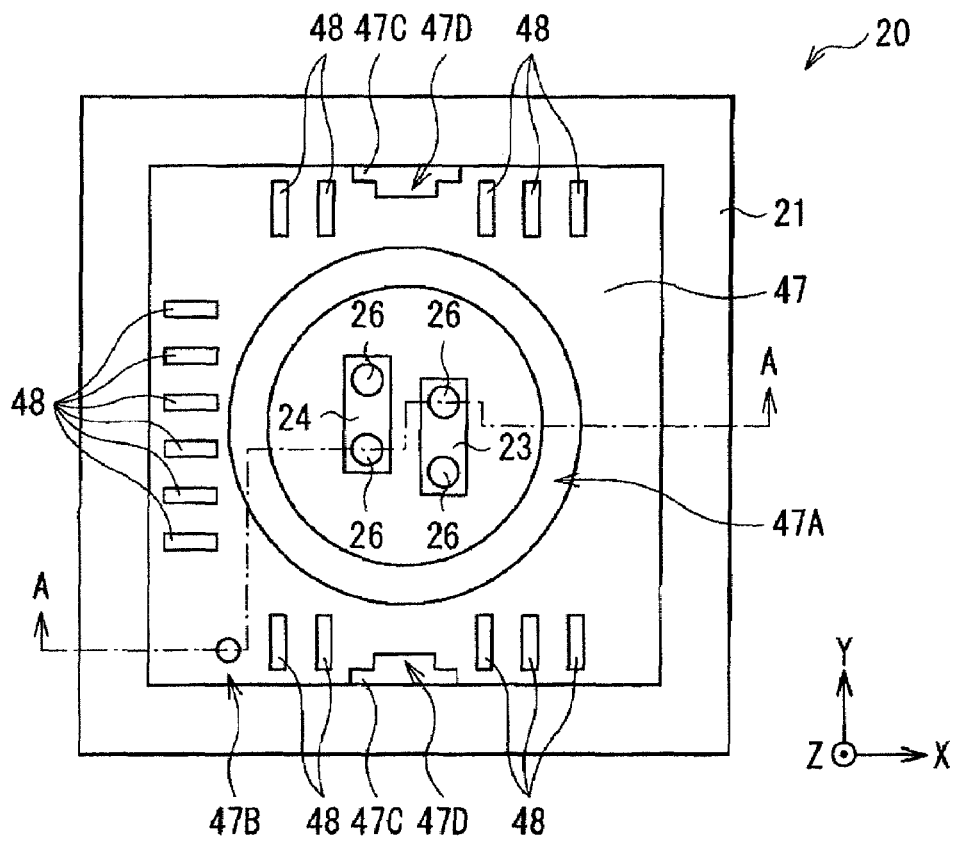
FIG. 9 is a plan view of a top surface of a male connector shown in FIG. 7.

FIG. 6 shows an example of a sectional configuration of an optical-electrical transmission device 2 according to a second embodiment of the invention. FIG. 7 shows an example of a side configuration of the optical-electrical transmission device 2 shown in FIG. 6. The optical-electrical transmission device 2 provides coupling between optical transmission paths and coupling between electrical transmission paths, and the optical-electrical transmission device 2 includes a female connector 30 and a male connector 40. FIG. 8 shows an example of a bottom surface configuration of the female connector 30, and FIG. 9 shows an example of a top surface configuration of the male connector 40. FIG. 6 corresponds to sectional configurations taken along arrow lines A-A of FIGS. 8 and 9.

The same configurations, functions and effects as those in the above-described embodiment will not be further described, and only different configurations, functions and effects from those in the above-described embodiment will be mainly described below.

In the female connector 30, one or a plurality of light guides 12, one or a plurality of collimating lenses 13 and positioning sections 14 and 35 are arranged on the flexible board 11. In the embodiment, the positioning section 14 does not have a positioning function because of a relationship with the positioning section 35.

The positioning section 35 determines the position (a position in a direction orthogonal to the optical axis AX2) of the female connector 30 with respect to the male connector 40 when connecting the female connector 30 to the male connector 40. A part having a positioning function of the positioning section 35 is formed on one surface of the flexible board 11, for example, a surface on which the collimating lens 13 is formed of the flexible board 11. The positioning section 35 has a tubular shape having a central axis in the normal direction to the flexible board 11, and has an opening 35A on a bottom surface of the tubular shape. The opening 35A has, for example, a circular shape or an oval shape. The opening 35A preferably has a circular shape with the central axis of the positioning section 35 as its center. Moreover, the central axis of the positioning section 35 preferably overlaps the central axis C of the positioning section 14. The opening 35A has a ring-shaped inclined surface 35B having a normal intersecting the normal to the bottom surface of the positioning section 35 on the bottom surface of the positioning section 35. The inclined surface 35B has a tapered shape in the bottom surface of the positioning section 35, and the inclined surface 35B is formed so that a region (the opening 35A) surrounded by the inclined surface 35B is wider on a front side and narrower on a back side when viewed from the male connector 40. The inclined surface 35B is formed corresponding to surroundings of the collimating lens 13, and when the female connector 30 is connected to the male connector 40, the inclined surface 35B comes into contact with an inclined surface 47A (which will be described later) of the male connector 40. Moreover, as shown in FIGS. 6 and 8, the positioning section 35 has a depression 35C in an outer edge thereof. The depression 35C is a columnar depression extending to the normal direction to the flexible board 11, and when a projection 47B (which will be described later) of the male connector 40 fits into the depression 35C, the female connector 30 is prevented from rotating about the central axis of the positioning section 35 while the female connector 30 is in contact with the male connector 40. As shown in FIG. 7, the positioning section 35 further has an opening 35D in a part of the side surface of the tubular shape. When the projection 47D (which will be described later) of the male connector 40 fits into the opening 35D, the female connector 30 is prevented from being detached from the male connector 40. In the case where the positioning section 35 is formed by injection molding, insert molding or the like, the shape error of the positioning section 35 is, for example, approximately ±5 μm. The mounting precision of the positioning section 35 is, for example, approximately ±5 μm.

Moreover, as shown in FIGS. 7 and 8, on an outer edge of the positioning section 35 (in surroundings of the inclined surface 35B), one or a plurality of electrical interconnections 37 extending from an outer edge of the top surface of the positioning section 35 to an outer edge of the bottom surface through a side surface are formed. When the female connector 30 is connected to the male connector 40, an end positioned on the bottom surface of the positioning section 35 of each electrical interconnection 37 comes into contact with an electrode pad 48 (which will be described later) of the male connector 40 so as to have a role as an electrode pad providing coupling between an electrical transmission path on the female connector 30 side and an electrical transmission path on the male connector 40 side. Further, an end positioned on the top surface of the positioning section 35 of each electrical interconnection 37 has a role as an electrode pad connected to an electrode pad (not shown) formed on a surface of the flexible board 11.

In the male connector 40, one or a plurality of light-emitting devices 23, one or a plurality of light-sensing devices 24, a collimating lens 26 and a positioning section 47 are arranged on the intermediate board 21.

The positioning section 47 determines the position of the male connector 40 (a position in a direction orthogonal to the optical axis AX1) with respect to the female connector 30 when connecting the female connector 30 to the male connector 40. The positioning section 47 is formed on one surface of the intermediate board 21, for example, a surface on which the collimating lens 26 is formed of the intermediate board 21. The positioning section 47 has a ring-shaped inclined surface 47A having a normal intersecting the normal to the intermediate board 21. The inclined surface 47A preferably has a ring shape with the central axis of the positioning section 47 as its center. The inclined surface 47A has a tapered shape in the positioning section 47, and the inclined surface 47A is formed so that a region surrounded by the inclined surface 47A is narrower on a front side and wider on a back side when viewed from the female connector 30. The inclined surface 47A is formed corresponding to surroundings of the collimating lens 26, and when the female connector 30 is connected to the male connector 40, the inclined surface 47A comes into contact with the inclined surface 35B of the female connector 30. In FIGS. 6 and 7, the case where the positioning section 47 is arranged between the light-emitting device 23 and the light-sensing device 24, and the intermediate board 21 is exemplified; however, the positioning section 47 may be formed only around the light-emitting device 23 and the light-sensing device 24 or only around the collimating lens 26. Moreover, as shown in FIGS. 6 and 8, the positioning section 47 has a projection 47B on a top surface thereof. The projection 47B is a columnar projection extending in a normal direction to the intermediate board 21, and when the projection 47B fits into the depression 35C of the female connector 30, the female connector 30 is prevented from rotating about the central axis C while the female connector 30 is in contact with the male connector 40. Moreover, as shown in FIGS. 7 and 9, the positioning section 47 has a nail 47C projected in the normal direction to the intermediate board 21 in a part of an outer edge thereof The nail 47B has a projection 47D projected in a direction intersecting (orthogonal to) the normal direction to the intermediate board 21, and when the projection 47D fits into the opening 35D of the female connector 30, the female connector 30 is prevented from being detached from the male connector 40. The positioning section 47 is made of, for example, polyimide, and is able to be formed by, for example, injection molding or the like. In the case where the positioning section 47 is formed by injection molding, insert molding or the like, the shape error of the positioning section 47 is, for example, approximately ±20 μm in consideration of deformation in a reflow step. Further, the mounting precision of the positioning section 47 is, for example, approximately ±5 μm.

Moreover, the positioning section 47 has an electrode pad 48 connected to an end of an electrical interconnection (not shown) formed on the intermediate board 21. The electrode pad 48 comes into contact with the electrical interconnection 37 of the female connector 30 when connecting the female connector 30 to the male connector 40 so as to provide coupling between an electrical transmission path on the female connector 30 side and an electrical transmission path on the male connector 40 side. The electrode pad 48 has an exposed surface exposed to a surface of the positioning section 47, and the exposed surface is formed around the inclined surface 47A when viewed from the normal direction to the intermediate board 21. The pattern formation precision of the electrode pad 48 is, for example, approximately ±5 μm.

In the optical-electrical transmission device 2 according to the embodiment, after the female connector 30 and the male connector 40 are connected to each other, when the light-emitting device 23 is driven, light is emitted from the light-emitting device 23, the light is converted into parallel light by the collimating lens 26. After that, after the parallel light propagates through a space (gap) between the female connector 30 and the male connector 40, and passes through the opening 35A, the parallel light enters into the collimating lens 13. The light entering into the collimating lens 13 condenses onto an end of the light guide 12 by the collimating lens 13, and propagates through the light guide 12, and finally, the light is inputted into one device connected to the light guide 12. Moreover, after the female connector 30 and the male connector 40 are connected to each other, when light propagates from one device connected to the female connector 30, the light is converted into parallel light by the collimating lens 13. After that, after the parallel light propagates through a space (gap) between the female connector 30 and the male connector 40, and passes through the opening 35A, the parallel light enters into the collimating lens 26. After the light entering into the collimating lens 26 is condensed onto a light-sensing region of the light-sensing device 24 by the collimating lens 26, and is converted into a photocurrent in the light-sensing device 24, the photocurrent outputted from the light-sensing device 24 is finally inputted into another device connected through the intermediate board 21, a printed board or the like. Thus, in the optical-electrical transmission device 2, communication between one device and the other device is performed by optical transmission. Moreover, an electrical signal from one device connected to the female connector 30 side propagates to the other device connected to the male connector 40 side through the electrical interconnections 16 and 37 and the electrode pad 48, or an electrical signal from the other device connected to the male connector 40 propagates to the one device connected to the female connector 30 side through the electrode pad 48 and the electrical interconnections 16 and 37. Thus, in the optical-electrical transmission device 2, communication between one device and the other device is performed by electrical transmission.

In the embodiment, when the female connector 30 and the male connector 40 are connected to each other, the ring-shaped inclined surface 35B arranged corresponding to surroundings of the collimating lens 13 and the ring-shaped inclined surface 47A arranged corresponding to surroundings of the collimating lens 26 come into contact with each other, and the positioning sections 35 and 47 fit into each other. Thereby, even if each component constituting the female connector 30 and the male connector 40 has a shape error or a mounting error, displacement between the central axis of a region surrounded by the inclined surface 35B and the central axis of a region surrounded by the inclined surface 47A is able to be reduced.

For example, in the case where the shape error or the mounting error of each component constituting the female connector 30 and the male connector 40 is estimated as follows, the optical axis misalignment between the optical axis AX2 of the collimating lens 13 arranged corresponding to surroundings of the inclined surface 35B and the optical axis AX1 of the collimating lens 26 arranged corresponding to surroundings of the inclined surface 47A is approximately ±60 μm at maximum. In the embodiment, optical transmission between the male connector 40 and the female connector 30 is performed by parallel light by the collimating lenses 13 and 26, so even if the optical axis misalignment between the optical axis AX2 of the collimating lens 13 and the optical axis AX1 of the collimating lens 26 is approximately ±60 μm, light loss is able to be reduced to approximately 10% at most, and optical transmission is performed with low loss. Likewise, displacement between the electrical interconnection 37 arranged corresponding to surroundings of the inclined surface 35B and the electrode pad 48 arranged corresponding to surroundings of the inclined surface 47A is able to be reduced, so in the optical-electrical transmission device 2, electrical transmission between the female connector 30 and the male connector 40 is able to be performed together with optical transmission.

Pattern formation precision of electrical interconnection 37: ±5 μm

Position error between collimating lens 13 and positioning section 35: ±5 μm

Shape error of positioning section 35: ±5 μm

Mounting precision of positioning section 35: ±10 μm

Pattern formation precision of electrode pad 48: ±5 μm

Mounting precisions of light-emitting device 23 and light-sensing device 24: ±5 μm Position error between collimating lens 26 and light-emitting device 23 or light-sensing device 24: zero Shape error of positioning section 47 (in consideration of deformation in a reflow step): ±20 μm Mounting precision of positioning section 47: ±5 μm Total: ±60 μm Moreover, in the embodiment, the collimating lenses 13 and 26 each are arranged in a light-passing region, and are different from a component needing a large occupied volume such as an optical fiber. Therefore, a large number of collimating lenses 13 and 26 are able to be used on surfaces of the small positioning sections 35 and 37, thereby the number of buses is able to be easily increased with little limitation. Moreover, in the embodiment, the light guide 12 is arranged in a connector (the female connector 30) in which the light-emitting device 23 or the light-sensing device 24 is not mounted, so it is not necessary to select a special material having resistance to a high-temperature process for the light guide 12, and a commonly-used material is able to be used.

Further, in the embodiment, the female connector 30 and the male connector 40 are connected to each other in the normal direction to the intermediate board 21, so an IC socket structure widely penetrating in the mounting industry is able to be used in the positioning sections 35 and 47. Therefore, when the optical-electrical transmission device 2 according to the embodiment is used in an electronic device, there is an advantage that enormous efforts to confirm performance, reliability or the like are not necessary.

Moreover, in the embodiment, in the case where the intermediate board 21 is directly mounted on an LSI chip, the length of an electrical line providing coupling between the light-emitting device 23 or the light-sensing device 24 and the LSI chip is able to be minimized. Thereby, it is easier to take measures against noises of electrical signals or crosstalk, and a light modulation rate is able to be improved.

Application Example

Next, the case where the optical-electrical transmission devices 1 and 2 according to the above-described embodiments are applied to an electronic device 3 will be described below. The case where the optical-electrical transmission device 1 is applied to the electronic device 3 will be described below as an application example.

Figure 10:
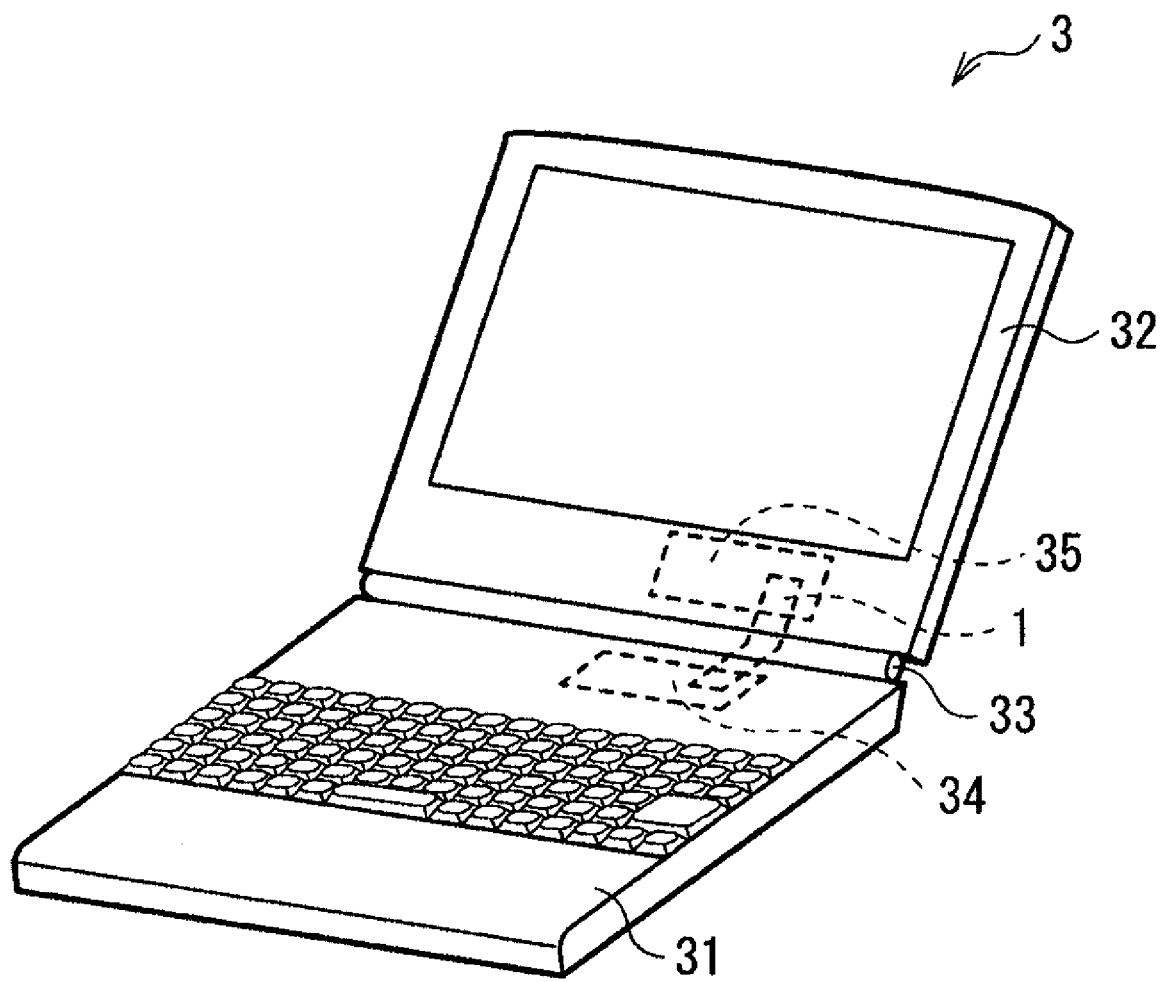
FIG. 10 is a schematic view of an electronic device according to an application example.
Figure 11:
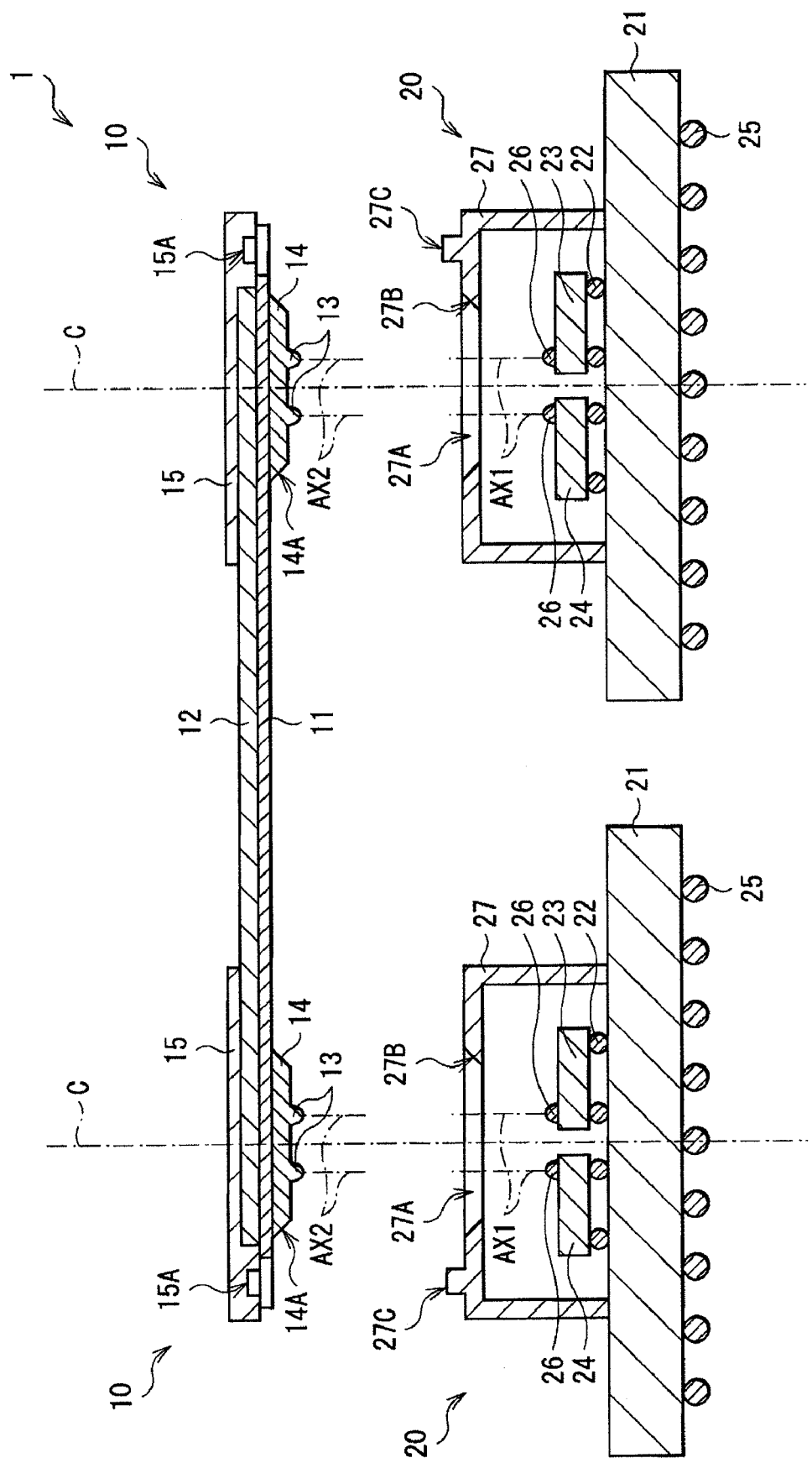
FIG. 11 is a sectional view of the optical-electrical transmission device shown in FIG. 10.

FIG. 10 shows a schematic configuration of the electronic device 3 according to the application example. The electronic device 3 includes an operation section 31 such as a keyboard, a display section 32 such as a liquid crystal display, and a connecting section 33 rotatably connecting the operation section 31 and the display section 32 to each other. In the electronic device 3, the optical-electrical transmission device 1 performs communication between a device 34 and a device 35 by optical-electrical transmission, and as shown in FIG. 11, one female connector 20 is connected to the device 34, and the other female connector 20 is connected to the device 35. Then, the male connectors 10 arranged on both ends of the light guide 11 are connected to these two female connectors 20, respectively. Moreover, the light guide 11 and the flexible board 11 are arranged so as to penetrate through the connecting section 33.

Thereby, for example, after one of the female connectors 20 of the optical-electrical transmission device 1 is mounted on the device 34, and the other female connector 20 of the optical-electrical transmission device 1 is mounted on the device 35, and the devices 34 and 35 on which the female connectors 20 are mounted are mounted on the electronic device 3, when only the male connectors 10 of the optical-electrical transmission device 1 are connected to the female connectors 20 mounted on the devices 34 and 35, the electronic device 3 capable of performing communication between the device 34 and the device 35 by optical-electrical transmission is able to be manufactured. Thus, in the application example, the electronic device 3 is able to be manufactured only by simple assembling steps, so the time or cost necessary for manufacturing is able to be kept low.

It should be understood by those skilled in the art that various modifications, combinations, sub-combinations and alterations may occur depending on design requirements and other factors insofar as they are within the scope of the appended claims or the equivalents thereof.

What is claimed is:

1. An optical-electrical transmission connector being connected to the other optical-electrical transmission connector, the other optical-electrical transmission connector including one or a plurality of optical devices which include at least one of a light-emitting device emitting light to one direction and a light-sensing device sensing light from the one direction, one or a plurality of first collimating lenses arranged in a light-passing region where light emitted from or entering into the one or the plurality of optical devices passes through, a first positioning section having a ring-shaped first inclined surface formed corresponding to surroundings of the first collimating lens when viewed from the one direction, and one or a plurality of first electrical transmission electrode pads formed corresponding to surroundings of the first inclined surface when viewed from the one direction, the optical-electrical transmission connector comprising:

one or a plurality of second collimating lenses facing the first collimating lens in the one direction when connecting the optical-electrical transmission connector to the other optical-electrical transmission connector;

a second positioning section formed corresponding to surroundings of the second collimating lens and having a ring-shaped second inclined surface, the second inclined surface coming into contact with the first inclined surface when connecting the optical-electrical transmission connector to the other optical-electrical transmission connector;

one or a plurality of light guides arranged corresponding to the focal point of the second collimating lens; and one or a plurality of second electrical transmission electrode pads formed corresponding to surroundings of the second inclined surface, and coming into contact with the first electrical transmission electrode pad when connecting the optical-electrical transmission connector to the other optical-electrical transmission connector.

2. An optical-electrical transmission connector being connected to the other optical-electrical transmission connector, the other optical-electrical transmission connector including one or a plurality of first collimating lenses, a first positioning section having a ring-shaped first inclined surface formed corresponding to surroundings of the first collimating lens, one or a plurality of light guides arranged corresponding to the focal point of the first collimating lens, and one or a plurality of first electrical transmission electrode pads formed corresponding to surroundings of the first inclined surface, the optical-electrical transmission connector comprising:

one or a plurality of optical devices including at least one of a light-emitting device emitting light to the first collimating lens and a light-sensing device sensing light from the first collimating lens when connecting the optical-electrical transmission connector to the other optical-electrical transmission connector;

one or a plurality of second collimating lenses arranged in a light-passing region where light emitted from or entering into the one or the plurality of optical device passes through;

a second positioning section formed corresponding to surroundings of the second collimating lens, and having a second inclined surface arranged so that when the optical-electrical transmission connector is connected to the other optical-electrical transmission connector, the second inclined surface comes into contact with the first inclined surface, and when the second inclined surface comes into contact with the first inclined surface, the second collimating lens faces the first collimating lens; and one or a plurality of second electrical transmission electrode pads formed corresponding to surroundings of the second inclined surface, and coming into contact with the first electrical transmission electrode pad when connecting the optical-electrical transmission connector to the other optical-electrical transmission connector.

3. An optical-electrical transmission device comprising:

a first optical-electrical transmission connector; and a second optical-electrical transmission connector connected to the first optical-electrical transmission connector, wherein the first optical-electrical transmission connector includes:

one or a plurality of optical devices including at least one of a light-emitting device emitting light to one direction and a light-sensing device sensing light from the one direction;

one or a plurality of first collimating lenses arranged in a light-passing region where light emitted from or entering into the one or the plurality of optical devices passes through;

a first positioning section having a ring-shaped first inclined surface formed corresponding to surroundings of the first collimating lens when viewed from the one direction; and one or a plurality of first electrical transmission electrode pads formed corresponding to surroundings of the first inclined surface when viewed from the one direction; and the second optical-electrical transmission connector includes:

one or a plurality of second collimating lenses facing the first collimating lens in the one direction when connecting the second optical-electrical transmission connector to the first optical-electrical transmission connector;

a second positioning section formed corresponding to surroundings of the second collimating lens, and having a ring-shaped second inclined surface, the second inclined surface coming into contact with the first inclined surface when connecting the second optical-electrical transmission connector to the first optical-electrical transmission connector;

one or a plurality of light guides arranged corresponding to the focal point of the second collimating lens; and one or a plurality of second electrical transmission electrode pads formed corresponding to surroundings of the second inclined surface, and coming into contact with the first electrical transmission electrode pad when connecting the second optical-electrical transmission connector to the first optical-electrical transmission connector.

4. The optical-electrical transmission device according to claim 3, wherein the first collimating lens is arranged around the central axis of a region surrounded by the first inclined surface when viewed from the one direction, and the second collimating lens is arranged around the central axis of a region surrounded by the second inclined surface when viewed from the one direction.

5. The optical-electrical transmission device according to claim 3, wherein the first optical-electrical transmission connector includes a plurality of the first collimating lenses, the second optical-electrical transmission connector includes a plurality of the second collimating lenses, the first collimating lenses are arranged so as to be point-symmetrical about the central axis of a region surrounded by the first inclined surface when viewed from the one direction, and the second collimating lenses are arranged so as to be point-symmetrical about the central axis of a region surrounded by the second inclined surface when viewed from the one direction.

6. The optical-electrical transmission device according to claim 3, wherein the first collimating lens is formed in contact with the optical device.

7. The optical-electrical transmission device according to claim 3, wherein the first collimating lens is arranged on the optical device with a predetermined gap in between.

8. The optical-electrical transmission device according to claim 3, wherein the first inclined surface is formed so that a region surrounded by the first inclined surface is wider on a front side and narrower on a back side when viewed from the second optical-electrical transmission connector, and the second inclined surface is formed so that a region surrounded by the second inclined surface is wider on a front side and narrower on a back side when viewed from the first optical-electrical transmission connector.

9. The optical-electrical transmission device according to claim 3, wherein
the first positioning section and the second positioning section each have a structure performing positioning in a direction rotating about the central axis of a region surrounded by the first inclined surface when viewed from the one direction.

10. The optical-electrical transmission device according to claim 3, wherein
the first positioning section and the second positioning section each have a structure performing positioning in the one direction.

11. An electronic device comprising:
an optical-electrical transmission device performing communication between one device and the other device by optical-electrical transmission,
wherein the optical-electrical transmission device includes:
a first optical-electrical transmission connector connected to the one device;
a second optical-electrical transmission connector connected to the other device; and
a third optical-electrical transmission connector connected to the first optical-electrical transmission connector and the second optical-electrical transmission connector,
the first optical-electrical transmission connector includes:
one or a plurality of first optical devices including at least one of a first light-emitting device emitting light to a first direction and a first light-sensing device sensing light from the first direction;
one or a plurality of first collimating lenses arranged in a light-passing region where light emitted from or entering into the one or the plurality of first optical devices passes through;
a first positioning section having a ring-shaped first inclined surface formed corresponding to surroundings of the first collimating lens when viewed from the first direction; and
one or a plurality of first electrical transmission electrode pads formed corresponding to surroundings of the first inclined surface when viewed from the first direction,
the second optical-electrical transmission connector includes:
one or a plurality of second optical device including at least one of a second light-emitting device emitting light to a second direction and a second light-sensing device sensing light from the second direction;
one or a plurality of second collimating lenses arranged in a light-passing region where light emitted from or entering into the one or the plurality of second optical devices passes through;
a second positioning section having a ring-shaped second inclined surface formed corresponding to surroundings of the second collimating lens when viewed from the second direction; and
one or a plurality of second electrical transmission electrode pads formed corresponding to surroundings of the second inclined surface when viewed from the second direction, and
the third optical-electrical transmission connector includes:
one or a plurality of third collimating lenses facing the first collimating lens in the first direction when connecting the third optical-electrical transmission connector to the first optical-electrical transmission connector;
one or a plurality of fourth collimating lenses facing the second collimating lens in the second direction when connecting the third optical-electrical transmission connector to the second optical-electrical transmission connector;
a third positioning section formed corresponding to surroundings of the third collimating lens, and having a ring-shaped third inclined surface, the third inclined surface coming into contact with the first inclined surface when connecting the third optical-electrical transmission connector to the first optical-electrical transmission connector;
a fourth positioning section formed corresponding to surroundings of the fourth collimating lens, and having a ring-shaped fourth inclined surface, the fourth inclined surface coming into contact with the second inclined surface when connecting the third optical-electrical transmission connector to the second optical-electrical transmission connector;
one or a plurality of light guides arranged corresponding to each of the focal points of the third collimating lens and the fourth collimating lens;
one or a plurality of third electrical transmission electrode pads formed corresponding to surroundings of the third inclined surface, and coming into contact with the first electrical transmission electrode pad when connecting the third optical-electrical transmission connector to the first optical-electrical transmission connector; and
one or a plurality of fourth electrical transmission electrode pads formed corresponding to surroundings of the fourth inclined surface, and coming into contact with the second electrical transmission electrode pad when connecting the third optical-electrical transmission connector to the second optical-electrical transmission connector.

12. The electronic device according to claim 11, further comprising:
a connecting section between the one device and the other device, the connecting section rotatably connecting one member and the other member to each other,
wherein the one or the plurality of light guides are arranged so as to penetrate through the connecting section.

* * * * *